US005370149A

United States Patent [19]
Clarkson et al.

[11] Patent Number: 5,370,149
[45] Date of Patent: Dec. 6, 1994

[54] LINE BLIND VALVE

[75] Inventors: Curtis W. Clarkson; Larry F. Koll, both of Reno; Nicholas J. Williams, Sparks, all of Nev.

[73] Assignee: The Clarkson Company, Sparks, Nev.

[21] Appl. No.: 165,937

[22] Filed: Dec. 14, 1993

Related U.S. Application Data

[63] Continuation-in-part of Ser. No. 915,672, Jul. 21, 1992, Pat. No. 5,271,426, which is a continuation-in-part of Ser. No. 745,841, Aug. 16, 1991, abandoned.

[51] Int. Cl.$^5$ .............................................. F16K 35/00
[52] U.S. Cl. .................................... 137/375; 251/291; 251/328
[58] Field of Search ................ 137/375; 251/328, 360, 251/291

[56] References Cited

U.S. PATENT DOCUMENTS

| | | | |
|---|---|---|---|
| 2,577,434 | 12/1951 | Rosenbaum | 251/291 |
| 2,732,170 | 1/1956 | Shand . | |
| 3,010,694 | 11/1961 | Lynch | 251/291 |
| 3,235,224 | 2/1966 | Grove . | |
| 3,319,661 | 5/1967 | Shindler . | |
| 3,333,816 | 8/1967 | Williams et al. . | |
| 4,062,516 | 12/1977 | Grove . | |
| 4,145,057 | 3/1979 | Wheeler . | |
| 4,325,534 | 4/1982 | Roark et al. | 251/291 |
| 4,603,864 | 8/1986 | Raftis . | |
| 4,623,122 | 11/1986 | Gambetta . | |
| 4,658,847 | 4/1987 | McCrone . | |
| 4,685,685 | 8/1987 | Iverson . | |
| 4,688,597 | 8/1987 | Clarkson et al. . | |
| 4,693,447 | 9/1987 | Perez . | |
| 4,846,482 | 7/1989 | Blodgett et al. . | |
| 4,895,181 | 1/1990 | McKavanagh . | |

Primary Examiner—A. Michael Chambers
Attorney, Agent, or Firm—Nies, Kurz, Bergert & Tamburro

[57] ABSTRACT

A line blind valve is disclosed which includes a housing having opposed similar housing halves with resilient sleeve units which compressibly engage each other in the valve open condition and engage opposite sides of the gate or blind in the valve closed condition. The line blind valve provides visibility of all gate edges so as to give a positive indication that the gate or blind has passed completely through the seals. Lockout is also provided when the gate or blind is closed. Each sleeve unit has a plurality of compression holes extending axially and arranged at intervals relative to the circumference of the sleeve. An encircling stiffening ring of harder material is encapsulated in each sleeve so as to be positioned at the inner end of the compression holes. The line blind valve construction of the present invention results in no leakage to the outside when the valve is fully open and no leakage to the outside or past the gate internally when the valve is fully closed.

16 Claims, 17 Drawing Sheets

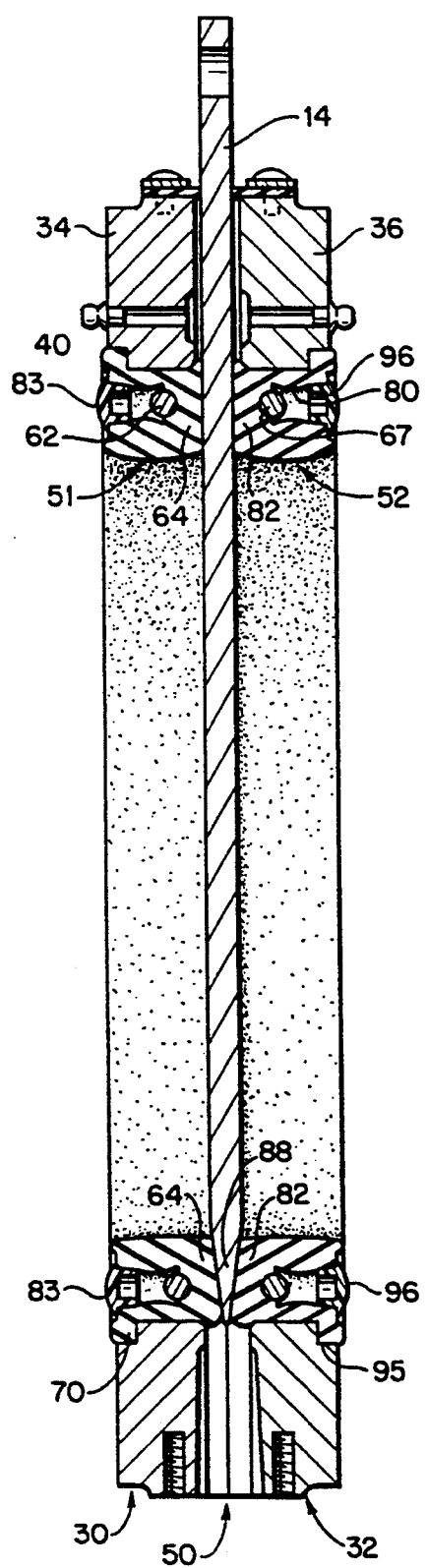
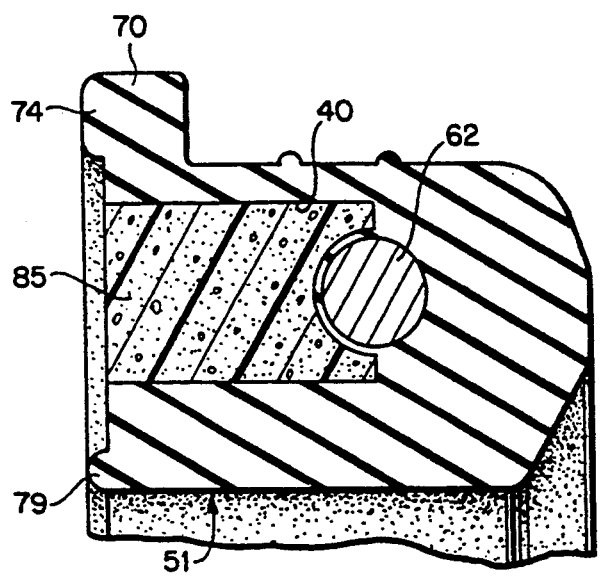
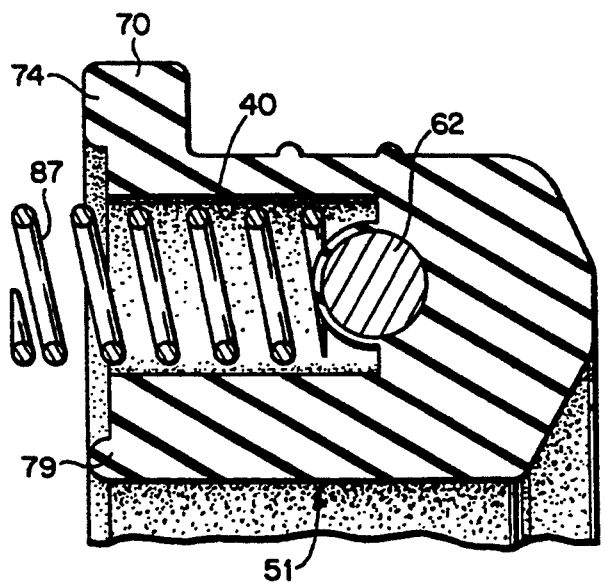

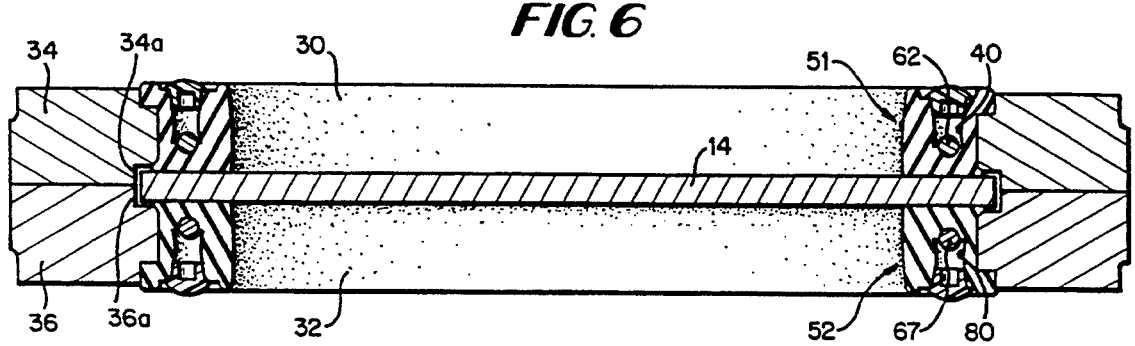
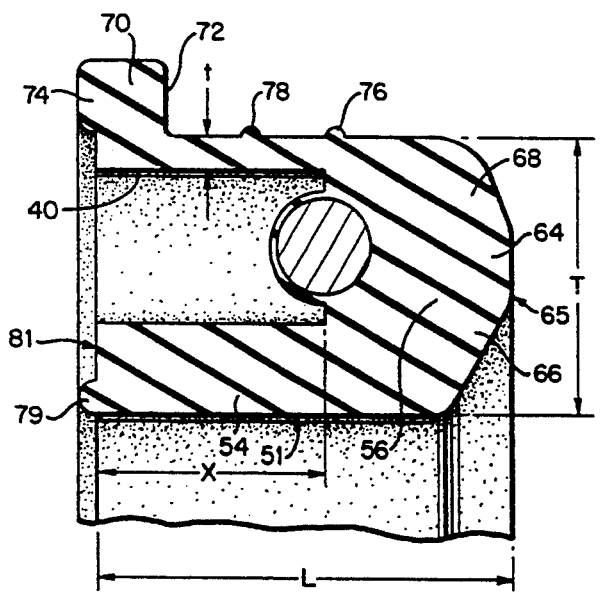
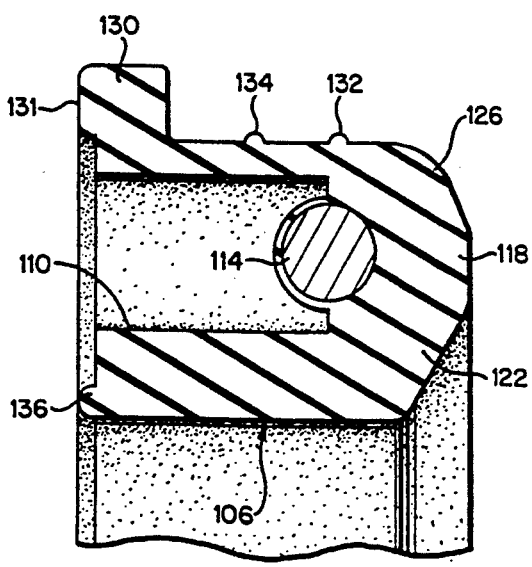

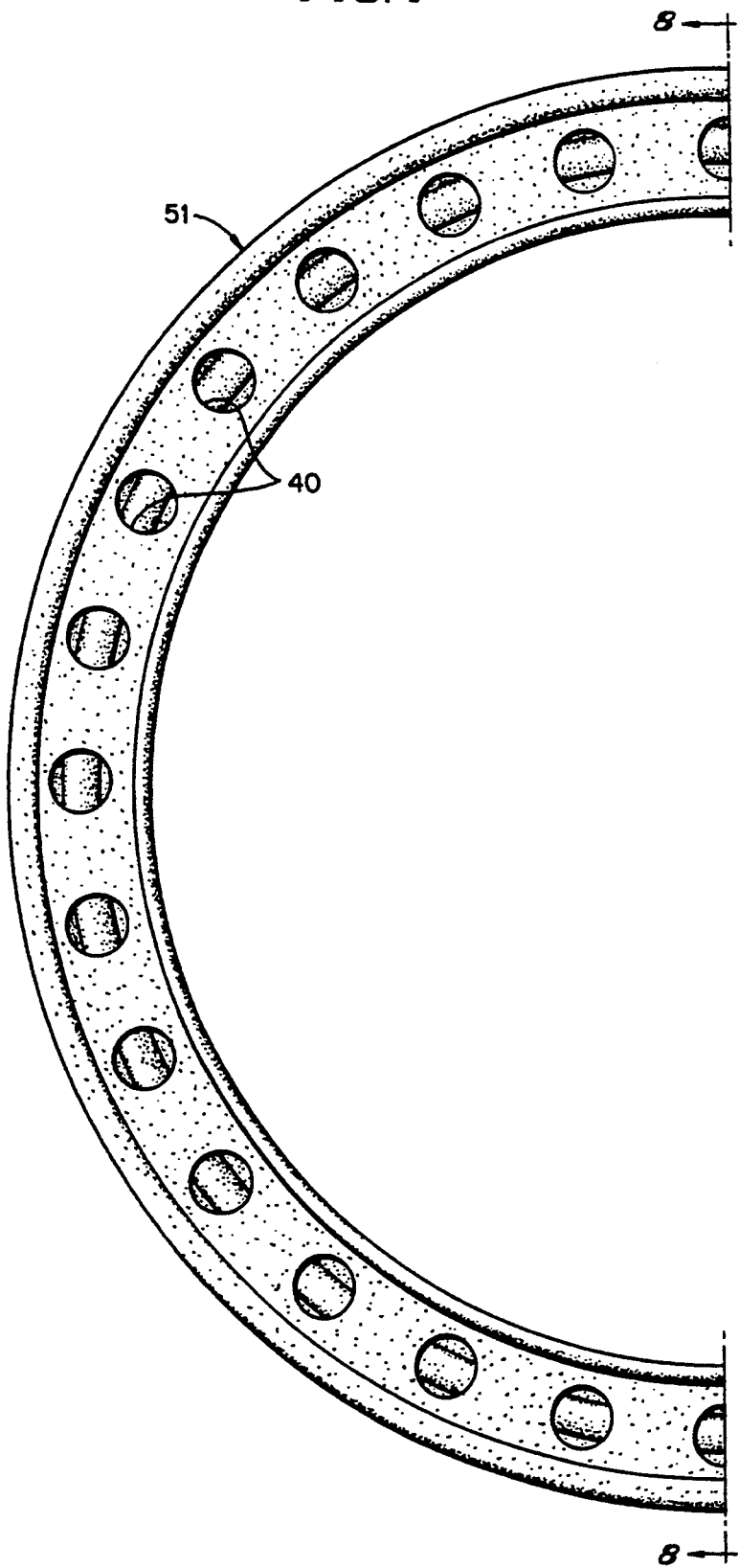
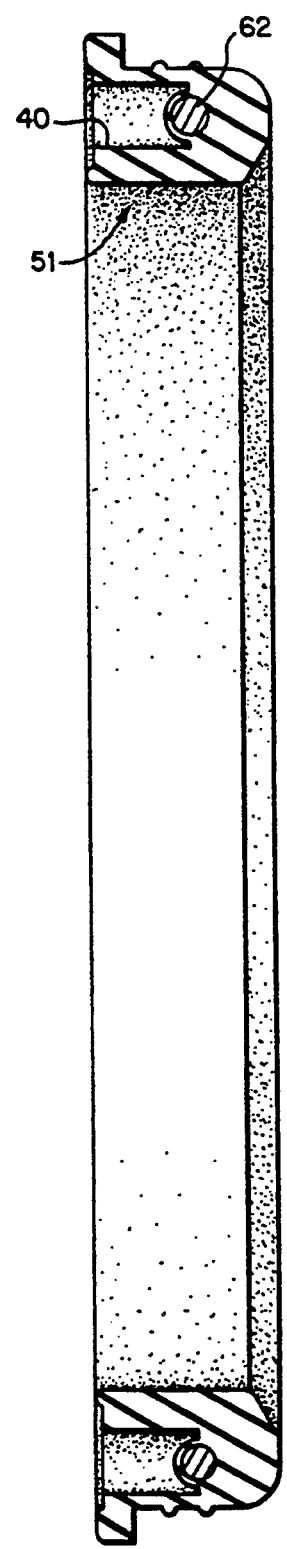

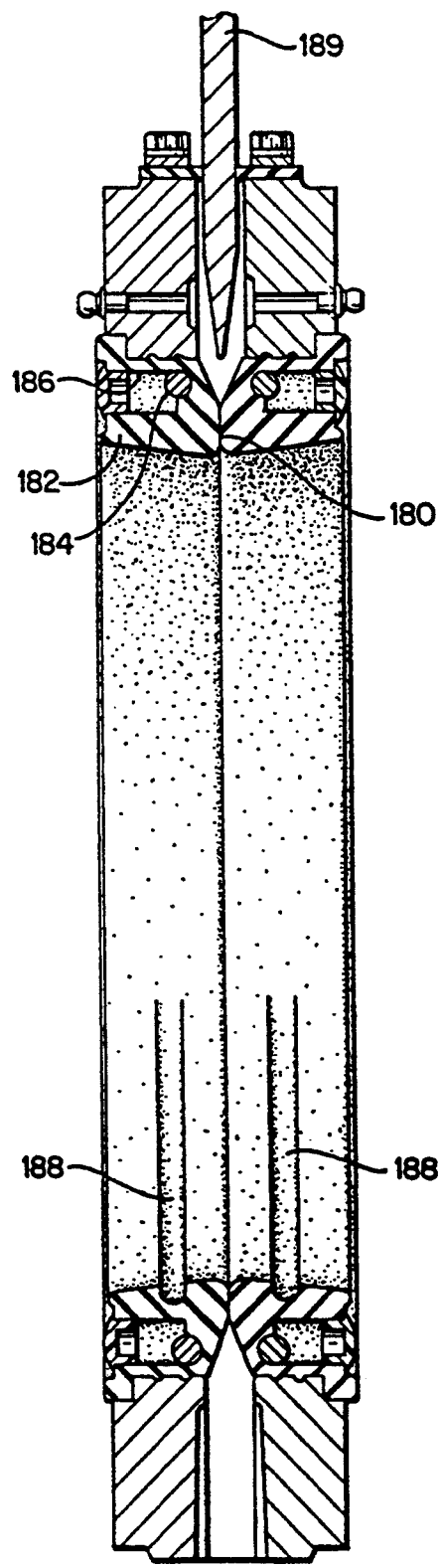
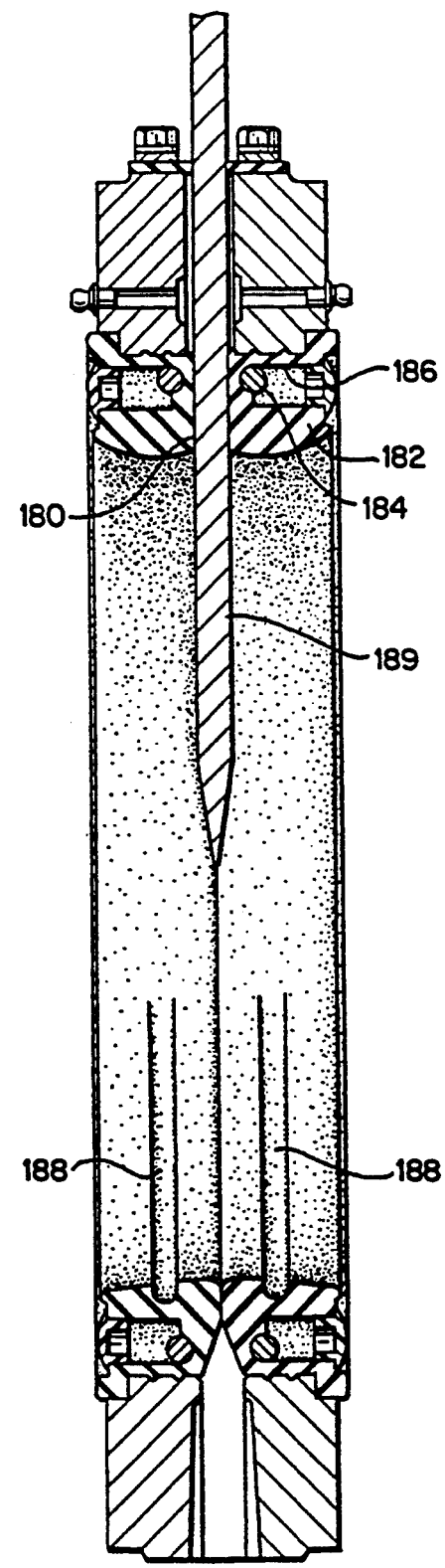

FIG. 27
FIG. 29
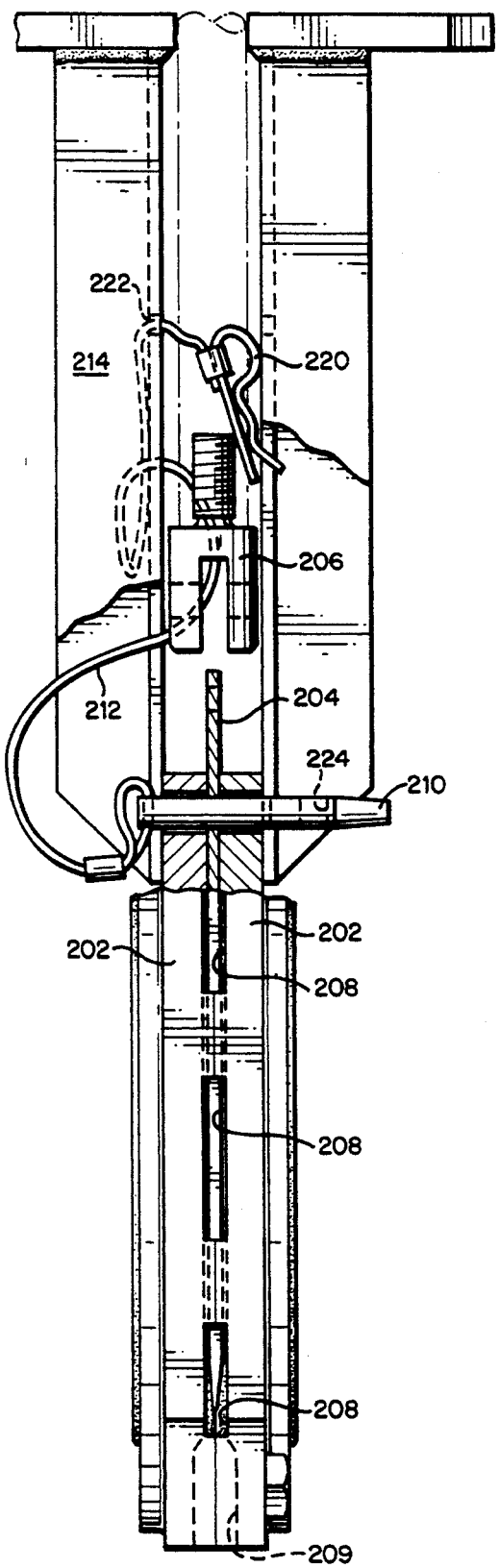
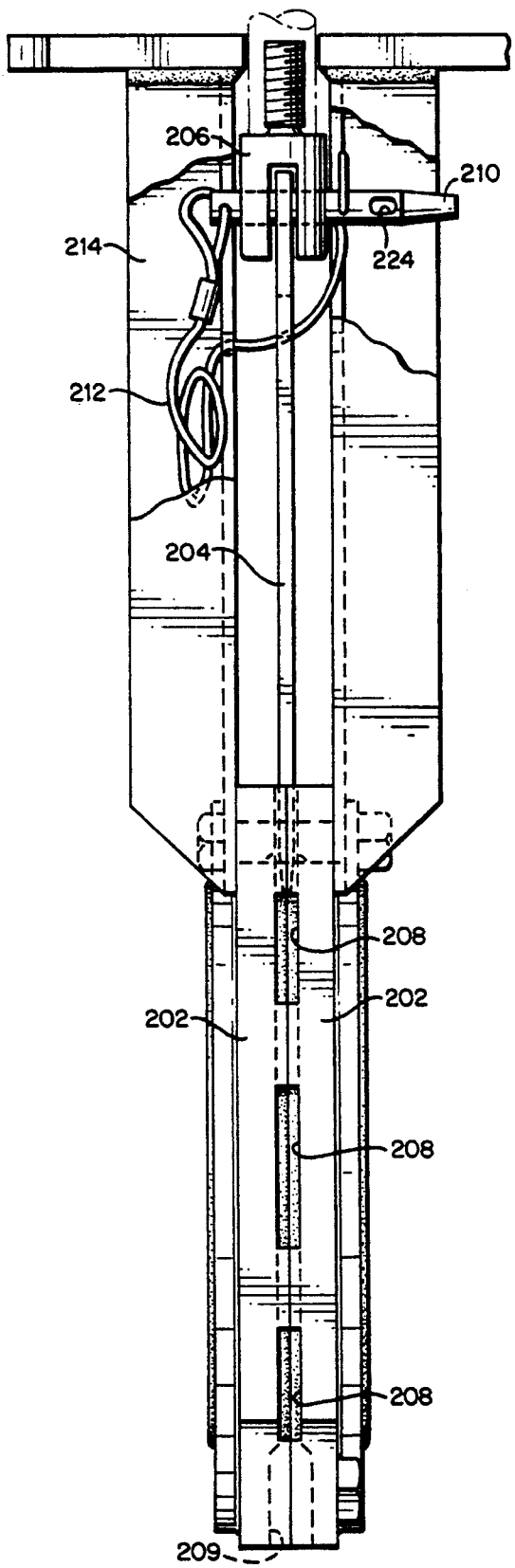

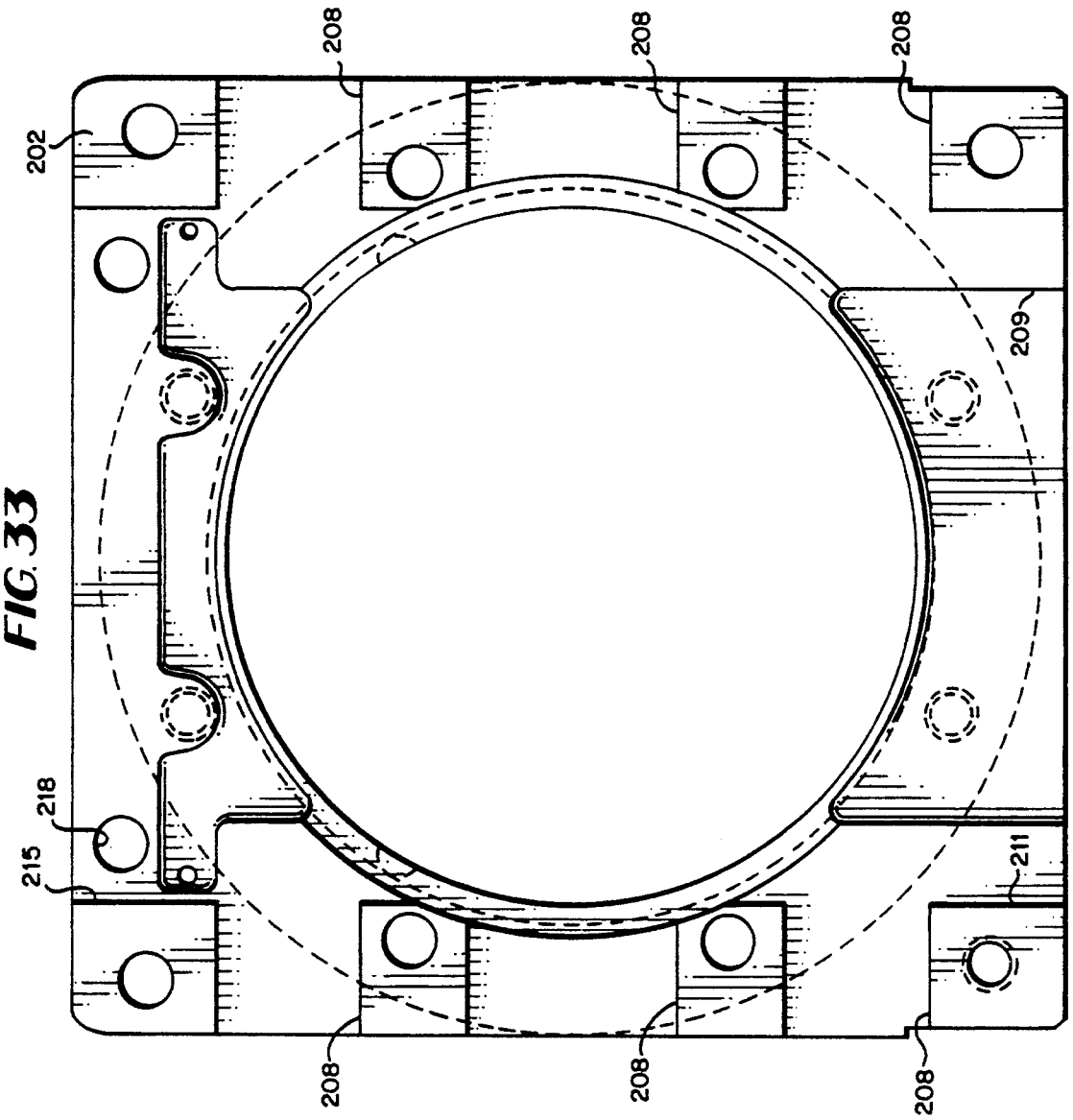

LINE BLIND VALVE

This is a continuation-in-part of application Ser. No. 915,672 filed Jul. 21, 1992 now U.S. Pat. No. 5,271,426 issued Dec. 21, 1993 which is a continuation-in-part of application Ser. No. 745,841 filed Aug. 16, 1991 now abandoned.

BACKGROUND AND SUMMARY OF THE INVENTION

The present invention relates to a gate valve and also a line blind valve having a specific construction of internal components including an elastomer sleeve and a stiffener ring which result in improved operation in sealing of the gate or blind. The gate valve and line blind valve of the present invention are particularly well suited for use with abrasive and corrosive slurries such as are encountered in the pulp and paper industry.

The line blind valve of the present invention is specifically constructed to meet the requirements for line blind service, whereby visibility of all gate edges is provided from the exterior of the housing so as to give a positive indication that the gate or blind has passed completely through the seals. In addition, the present line blind valve provides for lockout when the gate or blind is closed.

The present invention also provides an improved construction as compared to previous valves by a special arrangement of the sleeve structure and a stiffener ring at opposite sides of the gate or blind and with the sleeve having a novel coaction with the gate or blind and mounted in a novel manner in the valve housing.

The present invention employs a valve construction which is based on the resilient seating of elastomer seals or sleeves against a sliding gate or blind. As the gate or blind slides between the sealing sleeves during the valve opening or closing operation, the opposing sleeves are caused to move axially, coming together and separating respectively. Since the sleeves are made of non-compressible resilient elastomers, the sleeve material displaced by the gate or blind must move or flow into open areas or spaces designed to receive such movement.

In prior art valves, the open areas have been provided in the valve housing by allowing the sleeves to flow radially outward, thus enlarging the sleeve outside diameter. In addition, some valves have provided for radially inward movement into the inside opening of the sleeve where the process slurry flows.

By the present invention, open areas for receiving elastomer movement are located internally within the sleeve. This configuration has several advantages:

1. It allows a snug fit of the sleeves in the housing providing maximum support of the sleeves.
2. It allows for a wider range of valve sizes including larger diameter valves.
3. Internal movement of the sleeve has less resistance to the flow of the elastomer thus reducing the force required to actuate the valve. This is an economic consideration which reduces the size and cost of the valve actuator.
4. The concept also provides economies in the manufacture or molding of the elastomer sleeves. Pins that support the sleeve's metal stiffener ring in the mold leave the internal openings in the sleeve when it is removed from the mold. These remaining openings receive the elastomer movement when the valve is actuated. Since the metal stiffener ring is encapsulated in the sleeve with no part of it exposed, corrosion resistant metal such as stainless steel is not required thus reducing the overall sleeve cost.
5. A ported gate or blind can replace the standard knife gate or blind simply by removing the knife gate or blind and sliding the ported gate or blind into position and pinning it to the actuator clevis. The knife gate or blind sleeves are then replaced with shortened sleeves for the ported gate or blind. No modifications are required on the valve housing or actuator.

Accordingly, it is an object of the present invention to provide a line blind valve having all edges of the gate or blind visible from the exterior and with provision for lockout when the gate is closed.

It is a further object of the present invention to provide a gate valve or line blind valve assembly having improved features as to operation of the sleeve members with the gate or blind.

It is another object of the present invention to provide a novel gate valve or line blind valve assembly wherein resilient sleeve units at opposite sides of the gate or blind are mounted in a special manner in the valve housing and have special coaction with the relatively slidable gate or blind.

A further object of the invention is to provide a novel gate valve or line blind valve assembly wherein the inner ends of axially compressed sleeve units engage opposite sides of the gate or blind in the valve closed condition and sealingly engage in the valve open condition, and are of special structure providing improved coaction between the sleeve units and the gate or blind.

A further object of the invention is to provide a novel gate valve or line blind valve assembly wherein each sleeve end at the gate or blind is of a specific configuration and with a stiffener of novel construction and location being provided to maintain the sleeve in position when the gate or blind is opening or closing.

Another object of the invention is to provide a novel gate valve or line blind valve assembly wherein opposed sleeve units under axial compression are coaxially mounted in a novel manner in a valve housing.

Further objects of the invention will be apparent from the following description as taken with the appended claims and the accompanying drawings.

BRIEF DESCRIPTION OF THE DRAWINGS

FIGS. 4 and 5 are sections similar to FIG. 3 showing the valve in various stages at the partly closed and fully closed condition respectively.

FIG. 6 is a plan view of the gate valve taken along line 6—6 of FIG. 2.

FIG. 7 is an end elevation showing a portion of the gate valve sleeve of the invention.

FIG. 8 is a cross section taken along line 8—8 of FIG. 7.

FIG. 9 is an enlarged cross section through one of the openings in the sleeve, showing the sleeve and stiffener ring of the gate valve of FIG. 1.

FIG. 10 is a cross section similar to FIG. 9, showing the sleeve opening filled with closed cell foam.

FIG. 11 is a cross section similar to FIG. 9, showing a mechanical spring positioned in the sleeve opening.

FIG. 16 is an enlarged cross section showing the sleeve and stiffener ring of the gate valve of FIG. 12.

FIG. 21 is an enlarged fragmentary view mainly in section, showing the valve components of the embodiment of FIG. 19 in fully open condition and inserted in a pipeline with the opposed seal sleeves in end abutment.

FIGS. 22 and 23 are sections similar to FIG. 21 showing the valve in various stages at the partly closed and fully closed condition respectively.

FIG. 27 is a side elevation in partial cross section of the line blind valve of FIG. 26 in the closed position.

FIG. 29 is a side elevation of the line blind valve of FIG. 28 in the open position.

FIGS. 30 and 33 are opposite end elevations of one of the housing halves employed in the line blind valve of FIG. 26.

FIG. 32 is a cross section taken along line 32—32 of FIG. 30.

DESCRIPTION OF THE PREFERRED EMBODIMENTS

Figure 1:
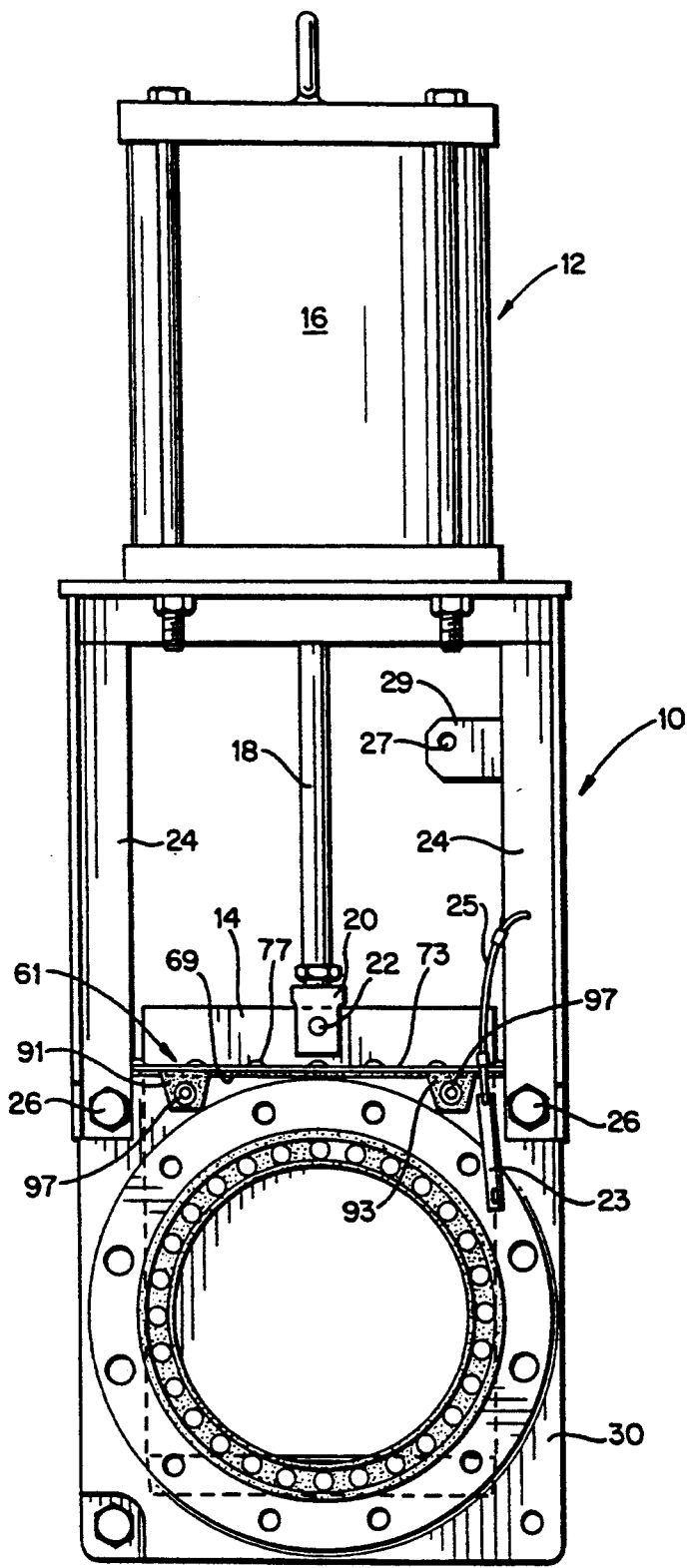
FIG. 1 is an end elevation showing a gate valve assembly according to the present invention.

In the illustrated embodiment of the invention as shown in FIGS. 1 through 11, there is provided a valve assembly 10 which includes a housing 11 adapted to be inserted coaxially into a pipeline, and a gate actuator 12 mounted on the housing.

The movable valve element is in the form of a flat smooth imperforate gate plate 14 of uniform thickness mounted for reciprocal movement in and out of the fluid flow path through the housing. The gate 14 is shown in the closed position in FIGS. 1 and 2. The actuator 12 is shown as a pneumatic or hydraulic cylinder 16 containing a piston rod 18 provided at the lower end with a bifurcated fitting 20 pivotally connected to a pin 22 on the upper end of the gate 14. Upon selective admission of fluid under pressure to the cylinder chambers at opposite sides of the piston in cylinder 16, the gate 14 may be moved between the pipeline open position of FIG. 3 and the closed position of FIG. 5 to be described in more detail hereinafter. The actuator 12 may also be a handwheel or an electric motor drive which rotates a threaded nut through which a screw stem passes, providing the required linear movement when attached to the gate 14. On larger valves, dual hydraulic cylinders mounted parallel on the sides of the valve may be used to minimize the overhead clearance requirement.

Figure 2:
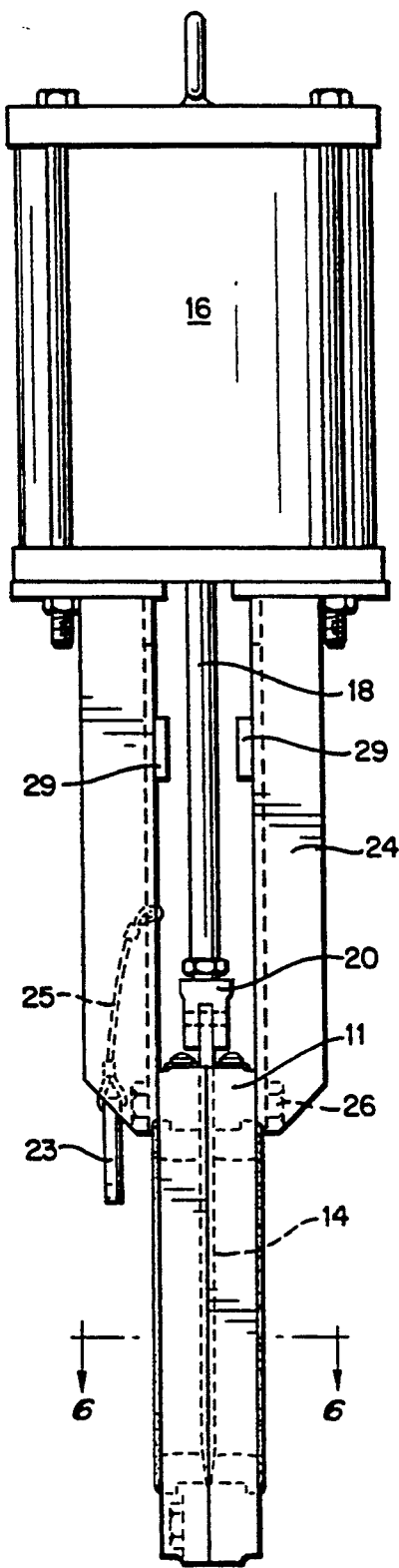
FIG. 2 is a side elevation of the gate valve assembly of the present invention.

Further description of the actuator and its function are not necessary to an understanding of the invention which relates essentially to the valve structure within the housing and its cooperation with the gate 14. The actuator may be mounted on the housing by a rigid two-piece frame 24 mounted externally on the housing plates by bolts 26, as shown in FIGS. 1 and 2.

Housing 11 includes opposed similar halves 30 and 32 having respective housing plates 34 and 36. The housing halves are rigidly secured together as by a series of bolts 26 extending through the adjacent housing plates. In this respect, the housing is similar to that of the above mentioned U.S. Pat. No. 4,688,597 which is incorporated by reference and to which reference is made for further detail. The housing plates 34 and 36 each include an axially inner portion 34a and 36a, as shown in FIG. 6, which together function as a spacer to provide a narrow space of sufficient width to pass gate 14 during operation of the valve. These housing plate portions 34a and 36a are machined to provide dimensional control of the gate passage which affects sleeve compression when the valve is in the open position. This gate passage or chamber space dimension is indicated at 50 in FIGS. 3 through 5 and it is of a fixed width slightly greater than the width of gate 14 when the bolt assemblies 26 are drawn tight except at the lower end where it fans outwardly for clean out purposes. The housing halves are preferably ductile iron or alloy castings for improved machinability.

Sealing sleeve units 51 and 52 are mounted in the respective housing halves. Sleeve unit 51 comprises an annular resilient body 54 of an elastomeric material such as natural rubber or other suitable elastomer such as polyurethane and is of reduced radial cross section at its inner end 56. On the interior of sleeve mid-body portion 60, the sleeve 51 is reinforced by an annular shaped stiffener ring 62 which may be formed of a durable material such as steel, hard polyurethane or equivalent plastic.

Sleeve 51 may be advantageously formed initially in a mold with a plurality of pins spaced at intervals along the circumference of the sleeve mold and with such pins being in contact at their inner ends with the stiffener ring 62. Upon removal from the mold and withdrawal of the pins, as shown in FIGS. 7 and 8, a plurality of internal compression openings or holes 40 are provided and a side wall portion of the stiffener ring 62 projects into each of the openings 40.

Since the sleeves 51 and 52 are made of a resilient elastomer which is a noncompressible solid, the sleeves 51,52 must flow out of the way as the gate 14 slides between them, separating the sleeves a distance equal to the thickness of the gate 14.

The compression holes 40 molded into the sleeve 51 provide space for the displaced volume of sleeve elastomeric material to flow into during opening and closing of the gate 14. Some elastomer will flow radially inwardly to the inside diameter of the sleeve 51 also. This is due to the fact that three sides of the elastomer sleeve 51 are supported, leaving only the radially inner surface of the sleeve 51 and the compression holes 40 unsupported for elastomer movement or flow. Because of the noncompressible nature of the elastomer, the sleeve volume will not change as the gate 14 moves to the closed position.

This sleeve construction provides the added unsupported surface area for elastomer movement or flow that more closely matches the unsupported surface area of the longer sleeves used in Clarkson valves such as those described in U.S. Pat. Nos. 4,257,447 and 4,895,181.

Figure 3:
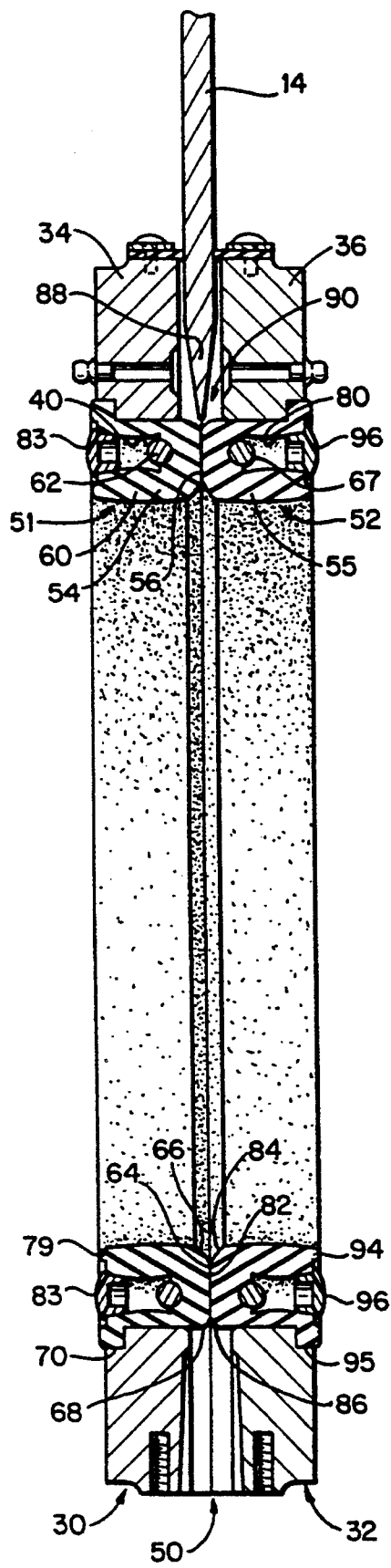
FIG. 3 is an enlarged fragmentary view mainly in section, with the section taken through openings in the sleeve, showing the valve components in fully open condition and inserted in a pipeline with the opposed seal sleeves in end abutment.
Figure 4:
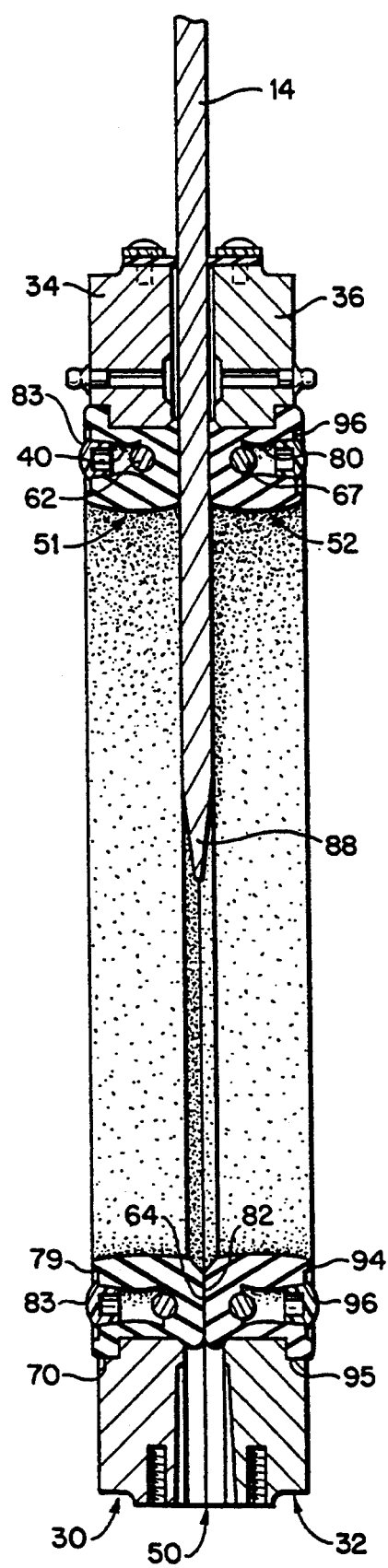

As shown in FIG. 9, the axially inner end portion 56 of sleeve 51 is formed with mid portion 64 having a flat, radially extending inner surface 65. Both the radially inwardly 66 and outwardly 68 portions of the sleeve axially inner end portion form an angle such as about 20 to 30 degrees relative to the diameter of the sleeve body 51. The sleeve portions 64, 66 and 68 will compress against the corresponding portions 82, 84 and 86 of sleeve unit 52 or against the gate, as shown in FIGS. 3 and 4.

At the axially outer end of the sleeve 51, a locking flange seal 70 extends radially outwardly for use in locking the sleeve 51 in place when the pipeline companion flange is bolted against the valve face, eliminating the need for a full face gasket flange on the sleeve 51. The locking flange seal 70 has a radially extending side wall 72 on its axially inner end and an axially outwardly extending sealing portion 74 which functions as a sealing bead.

A pair of locking beads 76 and 78 is located approximately midway along the radially outer surface of the sleeve 51, for the purpose of locking the sleeve 51 in the housing 34 when the valve is not in the pipeline, thus preventing the sleeve 51 from falling out. Locking bead 76 is located adjacent and axially inwardly of the radial centerline through the stiffener ring 62 cross section and the other locking bead 78 is approximately midway between locking bead 76 and locking flange seal 70. The locking beads 76 and 78 also prevent slurry from building up between the sleeve 51 and the housing plate 34 during opening and closing actuation.

Sealing bead 79 along with sealing portion 74 of locking flange seal 70 are provided circumferentially around the sleeve body 54 on the axially outer end surfaces of body 54 and flange 70 to provide a tighter seal against the adjoining pipeline flange. As shown in FIG. 9, inner sealing bead 79 is positioned so as to extend axially outwardly of the valve face 81 adjacent the radially inner end of sleeve 51.

The stiffener ring 62 retains the round sleeve integrity, preventing the sleeve 51 from following the gate 14 during opening and closing cycles.

The compression openings or holes 40 may be left empty as shown in FIG. 9 or, alternatively, may be sealed with plastic plugs 83 as shown in FIGS. 3 through 5. The holes 40 may also be filled with resilient closed cell foam 85 or have installed therein mechanical springs 87 as shown in FIGS. 10 and 11, respectively. A plastic plug may also be advantageously employed in conjunction with the resilient closed cell foam or a mechanical spring. In such an embodiment, the resilient closed cell foam or mechanical spring is positioned interiorly of the plastic plug within the hole 40. Sealing with plastic plugs 83 or filling with closed cell foam 85 will seal the holes 40, preventing any air from escaping from the holes 40 when the valve is under pressure from internal line pressure or from shortening of the sleeve 51 when the gate 14 is in the closed position. Loss of air can create a vacuum when the gate 14 is opened, causing liquid from the pipeline such as water or slurry to be sucked past the inside sealing bead 79 and thus filling the holes 40.

Mechanical springs 87 can be used to assist the sleeve 51 in returning to the required sealing length when the gate 14 is opened. This is especially useful when elastomers are employed having a permanent set quality below that of materials such as gum rubber, neoprene and butyl rubber, the materials normally employed in the invention.

With regard to the number and size of the compression openings or holes 40 within the sleeve 51, this may vary with the size of the valve. In general, however, it has been found, in accordance with the present invention, that there is a definite relationship which should be maintained between the total volume of the compression holes 40 and the total volume of the sleeve 51, without regard to valve size, in order to achieve the optimum valve operating characteristics. Expressed as a percentage, the total volume of the holes 40 remains within a range of 6 to 18 percent of the total sleeve volume. Hole diameter, depth or the total number of holes individually are not necessarily consistent from one valve size to another, but when all three parameters are combined, the resulting total volume of the holes 40 is consistently within the range of 6 to 18 percent of total sleeve volume.

With reference to FIG. 9, the dimension T is the radial distance between the radially inner and outer surfaces of the sleeve 51. The thickness t of the sleeve material between the hole 40 and the radially outer surface of the sleeve 51 has been found to have a value of 11.5% T for all valve sizes and types of elastomers. In addition, the axial distance x between the axially outer face 81 of the sleeve 51 and the radial centerline of the stiffener ring 62 cross section has been determined to be 56% L, where L is the axial distance between face 81 and the axially innermost surface 65 of the sleeve 51. This latter relationship is applicable when the sleeve 51 is formed of natural rubber and may vary from this by an amount of up to plus or minus 18% L for other elastomers, with such figures being applicable to all valve sizes.

The foregoing relationships with regard to the volume of the compression holes relative to the respective sleeve, as well as the sleeve dimensions, apply also to the ported gate configuration which is described hereinafter.

Sleeve unit 52 is similar to sleeve unit 51, having an annular resilient body 55 and carrying an annular shaped stiffener ring 67 at the axially inner end of the compression holes 80. Plugs 96 are provided for the holes 80. Axially inwardly of ring 67 the resilient body 55 is formed with an axially inwardly extending mid portion 82 and adjacent end portions 84,86 which are similar to axially inner portions 64,66 and 68 of sleeve 51. The sleeve body 55 for sleeve unit 52 is of similar cross sectional structure as sleeve unit 51, and has a sealing bead 94 which corresponds to sealing bead 79 of sleeve unit 51. Sleeve body 55 also has a locking flange seal 95 and locking beads 97 and 99 which correspond with the locking flange seal 70 and locking beads 76 and 78 of sleeve 51.

In practice, sleeve units 51 and 52 and the respective housing plates and stiffener rings may be identical and interchangeable, so that inventory may be held to a minimum.

When the sleeve units 51 and 52 are mounted within the housing, with the housing halves bolted together but not yet installed in a pipeline, the parts are positioned as shown in FIG. 3, so that sleeve end portions 64 and 82 are coaxially aligned and in light compressible contact. The valve is open. At this time the distance measured axially between housing halves 30 and 32 is greater than the thickness of the gate plate 14.

The lower edge of the gate plate 14 is tapered on both sides to provide a relatively sharp straight knife edge as shown at 88, and initially may extend within space 90, as shown in FIG. 3, but not far enough to appreciably forcibly engage sleeve end portions 66 and 84. This is the normal valve open condition of the valve assembly operably mounted in a pipeline, wherein the gate has not yet effectively penetrated the sleeve seal.

In the assembly of the present gate valve, the sleeves 51, 52 are installed on their respective housing plates 34, 36 after the valve has been completely assembled. FIGS. 3 through 5 show in succession the coaction of the gate and sleeve seals as the valve undergoes a closing operation.

In FIG. 3 following downward displacement of the piston, the descending gate 14 lower edge enters and forces apart the upper sector of the sleeves 51, 52 as it is slidably disposed between sleeve end faces 68 and 86 and then forces apart the end portions 64 and 82.

The valve moves from an open to a closed position as the gate 14 separates the two sleeves 51, 52 that seal against each other when the valve is open. As the gate separates the sleeves 51, 52, it blocks the flowing slurry in the pipeline providing bubble tight closure of the valve once the gate has reached its full travel across the port of the valve. In the closed position the sleeves 51, 52 seal against the faces of the gate 14.

As the gate 14 moves down, each of the stiffener rings, due to the ring positions being relatively surrounded by the resilient sleeve material, functions somewhat as a fulcrum to relieve some of the sealing compression between sleeve end portions 64 and 82 so that the tapered lower knife edge of the plate may more easily separate the lips. In so doing, the sleeves move into the space surrounding the gate and this action pulls the sleeve material back from the area of the sleeve end portions 64 and 82. This in turn reduces friction between the downwardly moving gate, which is slidably guided between sleeve end faces 68 and 86, and the opposing sleeve end portions. Excess sleeve material may displace into compression holes 40 and 80 and also radially inwardly to the inside diameter of the sleeves 51 and 52. By such overall action, the stiffener rings thereby provide for good smooth reduced friction sliding contact between the sleeves 51, 52 and the gate 14.

It has been found that the particular configuration and position of the stiffener rings 62, 67 results in two primary advantages: (1) the rings prevent the pliable sleeve material from following the gate 14 as it penetrates between the sleeve end portions 64 and 82. Without the rings 62, 67 the sleeves tend to grip the gate and follow it into the closed position; and (2) the position of the stiffener rings helps to align the sleeves with the housing plates, thus making each sleeve and housing plate concentric and also serving to align the two sleeves with each other, features which assist in providing for a smooth gate closing and opening action.

As the gate 14 penetrates further toward the closed position, the seal between sleeve end portions 64 and 82 is progressively parted while the relatively soft sleeve material effectively flows around the knife edge. The combination of the knife edge and the gate and the soft deformable material of the sleeve inner end portions minimize leakage from the valve during gate closing and opening operations. In this regard, a most important advantage of the gate valve construction of the present invention is that there is no leakage to the outside when the valve is fully open and no leakage to the outside or past the gate internally when the valve is fully closed.

FIG. 5 shows the gate in final closed valve position. By this time the knife edge has passed the lower sector of the sleeves 51, 52 and the gate is disposed between them, while the knife edge projects into the space below. At this time the opposed flat smooth side surfaces of the gate plate 14 are uniformly engaged under compression by the compressed sleeve inner end portions 64, 82, which may even be substantially flattened as shown, so that there is a complete annular seal of good radial extent within the valve. At this time the sleeve inner end portions are in uniform maximum compression and the internal pressure of the fluid or slurry in the pipeline will further force the upstream sleeve inner end into engagement with the gate 14, so that there is no leakage in the valve closed position, this action being aided by the inner surface portion of the sleeve.

In the gate closed condition, the area of the gate 14 that is unsupported is minimized by the present invention so that a maximum pressure rating for the valve can be obtained. In this regard, a critical dimension is the diameter of the stiffener rings as measured at the radially outermost point of the rings.

During movement of the gate 14 from the closed position of FIG. 5 to the open position of FIG. 3, substantially the reverse of the above described procedure takes place, the resiliency of the seal material maintaining sealing sliding contact between the sleeve inner end portions 64, 82 and the gate 14 until the gate 14 is withdrawn from between the sleeves.

The valve of the invention is a two-way valve, that is it may control flow in either direction in the pipeline and may be reversed end for end. The sleeve units 51 and 52 are essentially identical so that either may be reversed and function as described above in the assembly. The individual sleeve units are readily removed and replaced when damaged or worn, without having to disassemble the housing assembly.

Figure 17:
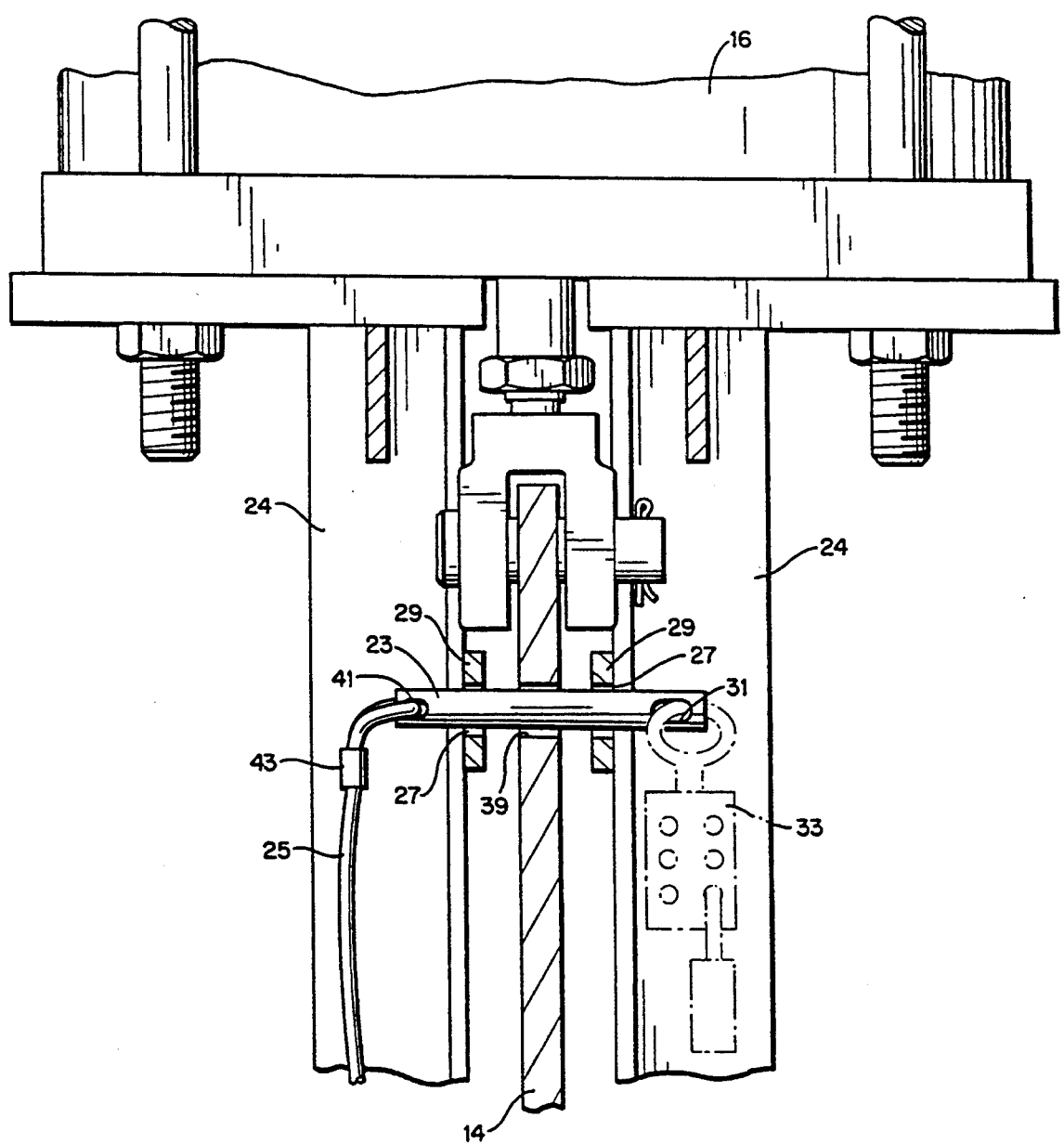
FIG. 17 is a side elevation in cross section showing the lockout device of the present invention in the valve open position.
Figure 18:
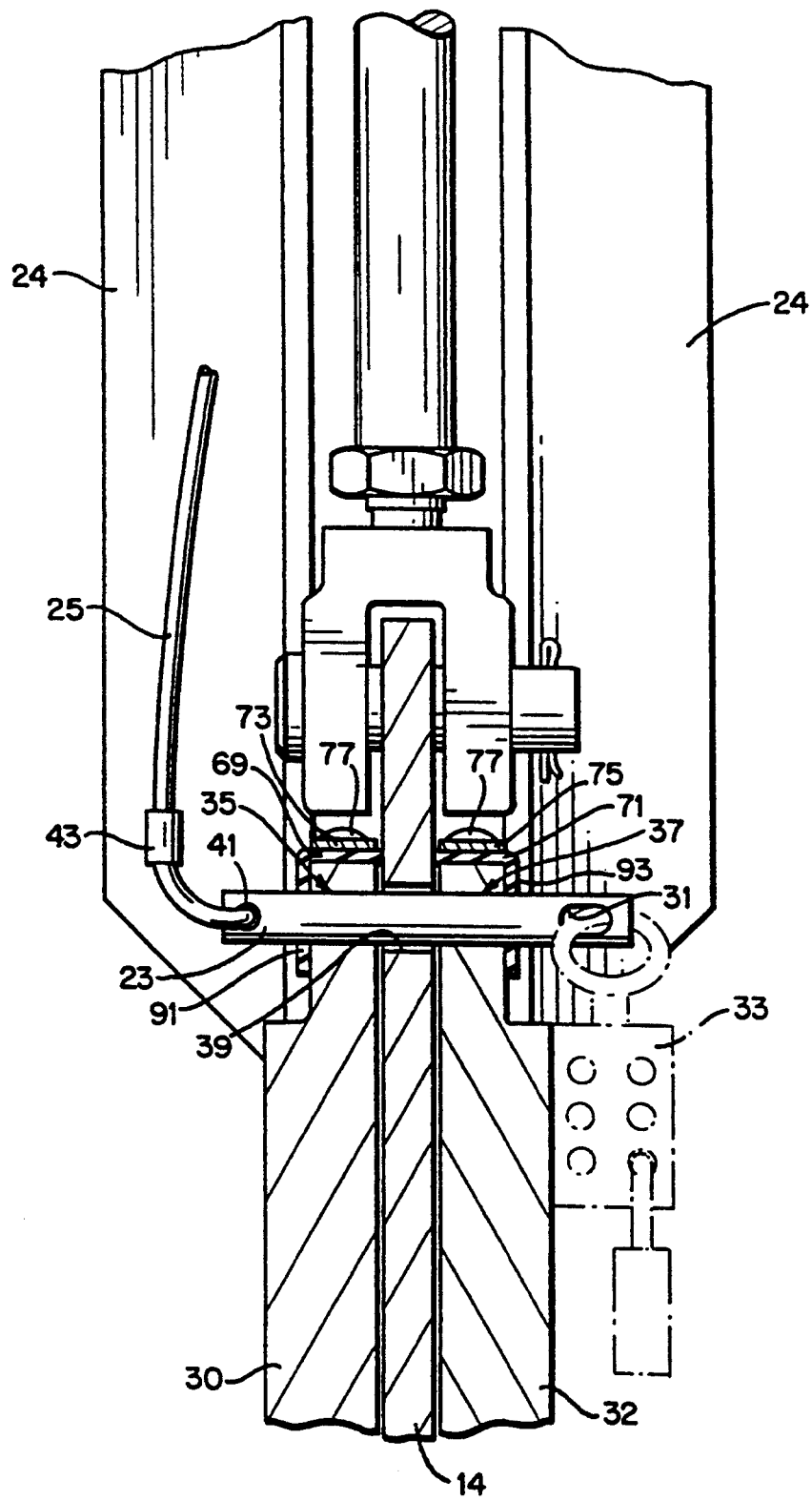
FIG. 18 is a side elevation in cross section showing the lockout device of FIG. 17 in the valve closed position.

As shown in FIGS. 1 and 2, a lockout pin 23, of a corrosion resistant steel or a similar durable material, is permanently attached to the frame 24 by means such as a corrosion resistant steel cable 25. Details of the lockout device are shown in FIGS. 17 and 18 for the valve open and valve closed condition, respectively. The primary function of the lockout pin 23, when inserted through aligned holes 35, 37 in both housings 30, 32 and hole 39 in the knife gate 14, is to positively prevent the valve from opening, as shown in FIG. 18. When inserted through the same hole 39 in the knife gate 14 and holes 27 in the two drilled brackets 29 welded to a frame up-right, the lockout pin 23 prevents the valve from closing, as shown in FIG. 17. Provisions have been made for the pin 23 to accept an OSHA approved lockable device.

The lockout pin 23 is made from a high tensile, non-corrosive alloy of sufficient length to pass through both brackets 29 and the knife gate 14 in the open position and both housings 30, 32 and the knife gate 14 in the closed position. Its diameter is such that the resulting cross sectional area is capable of resisting shear forces 1.75 times greater than can be generated by the valve actuator 12.

The lockout pin 23 has a hole 41 at one end of sufficient diameter so that a flexible corrosion resistant steel cable 25 can pass through it and form a loop. The loop is made permanent with a zinc coated copper crimp 43.

A slot 31 of sufficient width and length is made in the opposite end of the pin 23 to accommodate a standard padlockable clamp 33. This clamp 33, when fitted and locked, prevents removal of the lockout pin 23 from the selected locked position.

An elastomer wiper 61 is employed for use in wiping the gate 14 and also in conjunction with the lockout pin 23. The wiper 61 includes two side strip members 69, 71 as shown in FIG. 18 which are held in place on the housing plates 30, 32 by metal retainer strips 73, 75 secured by suitable fasteners 77. The wiper 61 has a pair of ears 91, 93 on each side as shown in FIGS. 1 and 18. Alignment holes are provided in the housing plates 30, 32 for receiving plugs 97, of stainless steel or similar material, which are inserted through the ears 91, 93. The alignment holes have a dual purpose. First, they serve to align the housing plates 30, 32 during assembly and secondly, on one side they provide the hole for the lockout pin 23 to be inserted through when the valve is in the closed position. The plugs 97 are held in the ears 91, 93 of the wiper 61 or in the corresponding ears on the opposite side of the gate 14 so as not to be easily lost when removed for lockout. Although lockout is on one side only, all four plugs 97 are identical.

Figure 12:
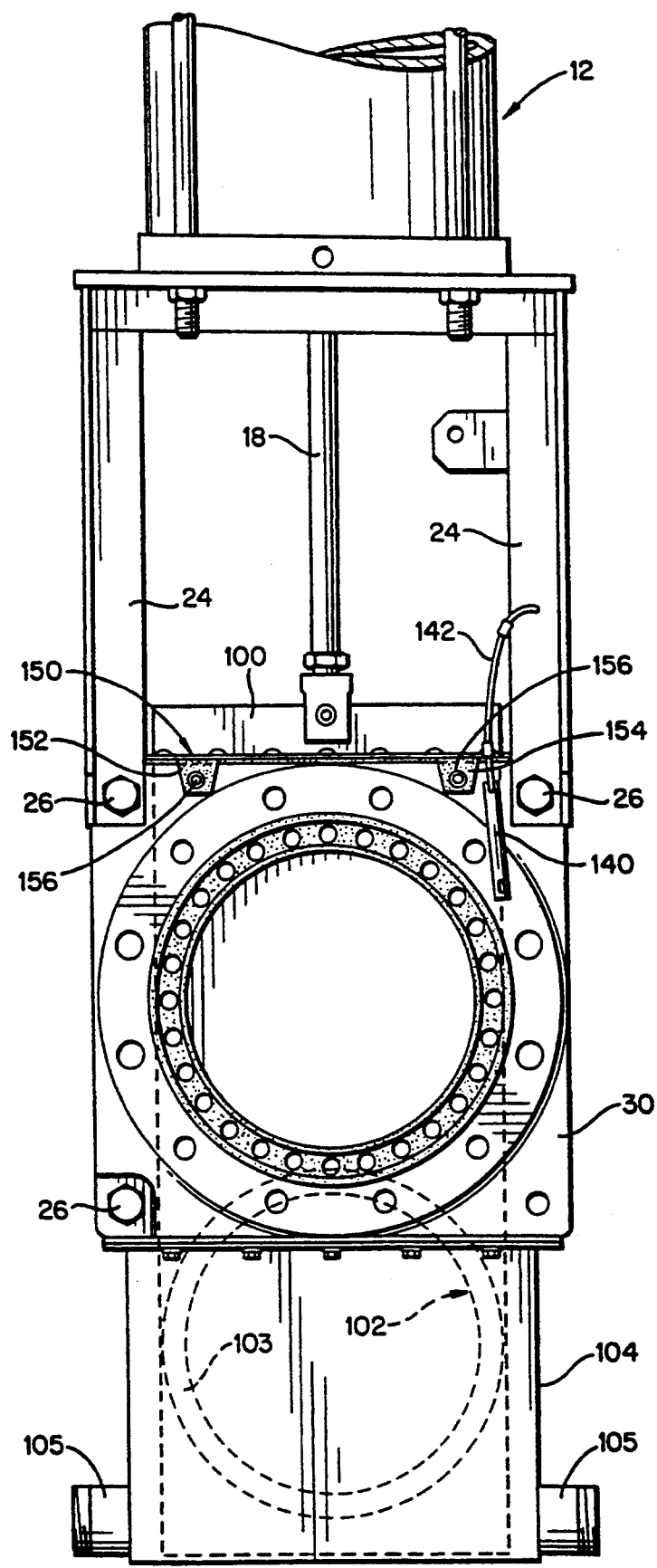
FIG. 12 is an end elevation of an alternative embodiment of the invention having a ported gate.

In the embodiment of the invention as shown in FIGS. 12 through 16, there is provided an alternative form of the present invention having a ported gate configuration. The valve of the present invention is constructed so that the knife gate construction can be converted to a ported gate simply by replacing the normal wear parts which in this case are the sleeves and gate. All other parts are common, including their function, so that no parts of the basic valve need to be changed. FIG. 12 illustrates the ported gate configuration with an air cylinder actuator 12. Actuator alternatives are the same as for the knife gate valve. Thus the actuator requires the same stroke and does not change upon converting to the ported gate construction. Since the gate and sleeves are replaceable wear parts, replacement or interchangeability between knife gate and ported gate is easily accomplished.

With reference to FIG. 12, the piston rod 18 and frame members 24 are the same as with the knife gate construction. Similar bolts 26 are provided for holding the housing plates 34, 36 together. The ported gate 100 with port 102 is shown in the fully closed position in FIG. 12. A gate guard 104 may be provided with the ported gate option for safety purposes and to catch slurry discharge from the valve during opening and closing cycles. A cleanout port or drain 105 may be provided on both sides of the gate guard 104 as shown in FIG. 12.

Figure 13:
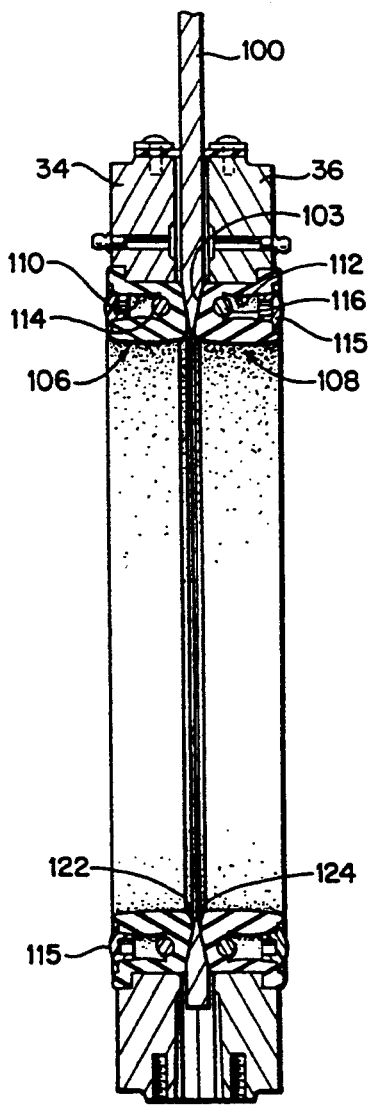
FIGS. 13 through 15 are sectional views showing the valve of FIG. 12 in the open, partly closed and fully closed condition respectively.
Figure 14:
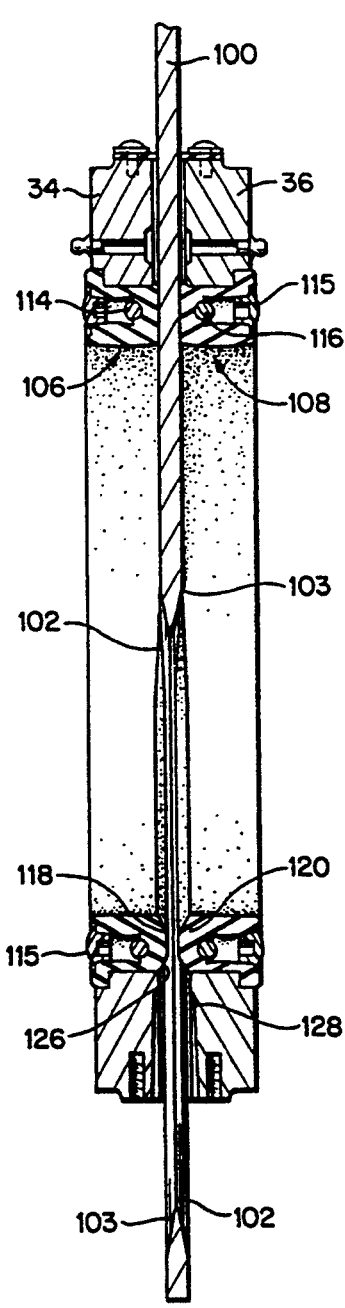
Figure 15:
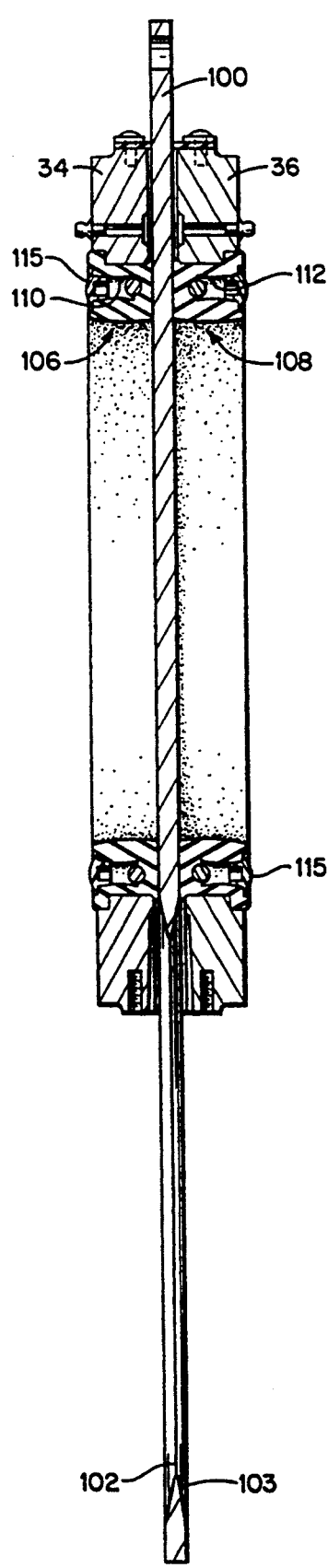

FIGS. 13 through 15 show in succession the coaction of the gate and sleeve seals as the valve undergoes a closing operation. The sleeves 106, 108 have a shorter axial length than the corresponding sleeves 51, 52 of the knife gate valve configuration. One of the sleeves 106 is shown in detail in FIG. 16.

The stiffener rings 114, 116 of the two sleeves 106, 108 are of the same size and position relative to the axially inner ends 118, 120 and the openings 110, 112 of the sleeves 106, 108 as are the stiffener rings 62, 67 of the first embodiment. The flat mid portion 118, 120 of the axially inner ends, as well as the radially inwardly 122, 124 and outwardly 126, 128 portions of the sleeves 106, 108 are of the same configuration as the corresponding portions 66, 68 of the first embodiment. The locking flange seal 130 with sealing portion 131, the locking beads 132 and 134 and the sealing bead 136 of sleeve 106 correspond with similar elements of sleeve 51 of the first embodiment and the same elements are provided for sleeve 108.

The compression holes 110, 112 in the embodiment of FIGS. 12 through 16 may remain open, as shown in FIG. 16, or may be sealed with plastic plugs 115, as shown in FIGS. 13 through 15. The compression holes 110, 112 may also be filled with closed cell foam or have installed therein mechanical springs, as in the case of the previous embodiment.

As can be seen in FIG. 13, when the ported gate 100 is in the valve open position, the knife edges 103 extending around the periphery of the gate port 102 are in position to separate the two sleeves 106, 108 so that they seal against the knife edges 103 of the gate 100. As the gate 100 and gate port 102 move downwardly, the gate 100 will continue to separate the sleeves 106, 108 at the upper end, as shown in FIG. 14, while at the lower end the sleeves 106, 108 will remain parted due to the presence of the gate 100 between the sleeves 106, 108. Finally, when the gate 100 reaches the fully closed position shown in FIG. 15, the sleeves 106, 108 will be separated by and seal against the full thickness of the gate 100.

The embodiment of FIG. 12 may also employ a lockout pin 140 with cable 142, similar to that employed with the previous embodiment. When used in conjunction with an adjustable yoke, the lockout pin 140 may be used to accurately align the ported gate 100 concentrically to both housings 30, 32. This feature can be of assistance when changing gates in the field.

As shown in FIG. 12, the embodiment of FIG. 12 may be provided with an elastomer wiper 150 having side strip members with ears 152, 154 for receiving plugs 156, in the same manner and for the same purpose as described in connection with the previous embodiment.

In forming the sleeves initially in a mold, as previously mentioned, raw elastomer is laid in the mold cavity. The pins are located in the top plate of the mold oriented downward toward the mold cavity. The free ends of the pins are machined to cradle the stiffener ring. As the hydraulic press closes the mold the stiffener ring is pushed uniformly through the elastomer and the raw elastomer flows around the ring, filling all the void space. The pins support and push the ring until the mold is closed and then hold it in its desired location as the elastomer cures. When the mold is opened the pins are removed leaving the ring and compression holes in place. The ring and compression holes are functional parts of the sleeve which together give the pins a dual purpose in the construction and molding of the sleeve.

With regard to the intersection of the compression holes and stiffener ring, it is important that the pins are machined to cradle the ring keeping the center of its cross-section on the axial centerlines of the compression holes. This maintains an evenly distributed force on the elastomer portion between the compression holes when the sleeves are compressed.

The resilient closed cell foam employed in the present invention may be silicon rubber or other elastomer. The main consideration is that the foam be "closed cell" so that there is no air loss when the holes are shortened as the gate closes.

The mechanical springs employed in the invention will assist in forcing the sleeves back together when the gate is opened. Each spring would fit into a compression hole, leaving room for elastomer flow, and seat against the stiffener ring. The open length of each spring would be up to 25 percent longer than the hole depth causing the springs to be slightly compressed when the valve is installed in the pipeline. Closing of the gate would cause the springs to compress further approaching the springs' closed length.

In the ported gate option, it is desirable to have axially shorter sleeves because the sleeves always seal against the gate and do not have to seal against each other. Shortening the sleeves causes less friction and less stress on the sleeves during opening and closing cycles.

In the embodiment as shown in FIGS. 19 through 25, there is provided an alternative construction for the gate valve sleeve of the present invention. In this embodiment, there are included the following modifications:

1. The circumferential seal end of each elastomer sleeve has been moved radially inward.
2. The stiffener ring is of an enlarged diameter and its position in the sleeve is moved radially outward.
3. A groove has been added along the inside surface of each sleeve in an arc of approximately 120 degrees extending approximately between the four o'clock and eight o'clock positions.

In a previous embodiment, as shown in FIG. 3, the stiffener ring is in axial alignment with the circumferential seal, so that the seal and stiffener ring are equidistant radially from the axis of the valve port. By contrast, the construction of this embodiment, with the stiffener ring and circumferential seal being offset axially with respect to each other, has been found to be the optimum functionally from the standpoint of minimizing external leakage from the valve during actuation and also minimizing the required actuating force. The sleeves are keyed as shown in FIG. 24, so they can fit in the valve one way only to insure that the groove is always between the four and eight o'clock positions.

Figure 19:
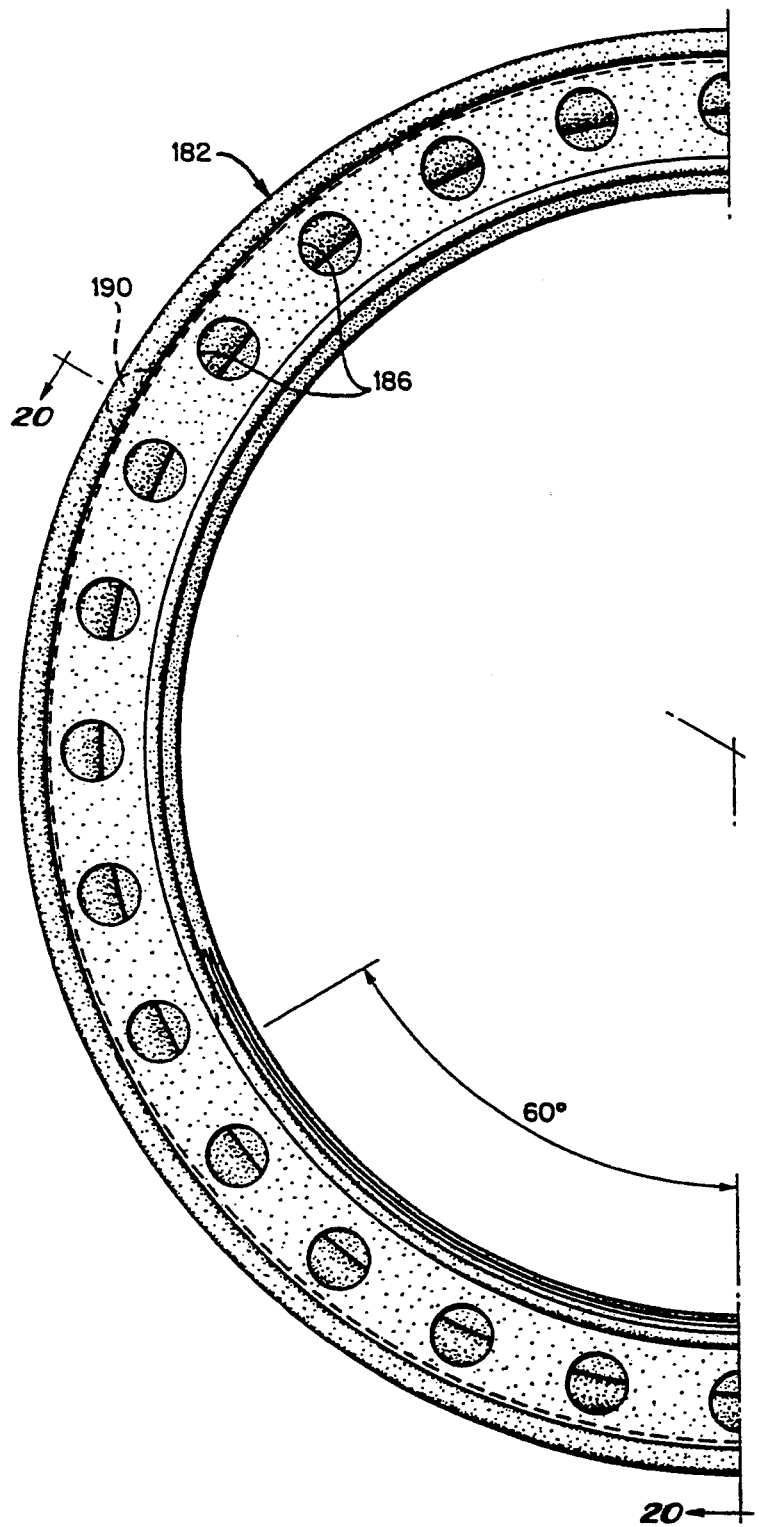
FIG. 19 is an end elevation showing a portion of the gate valve sleeve of another embodiment of the invention.
Figure 20:
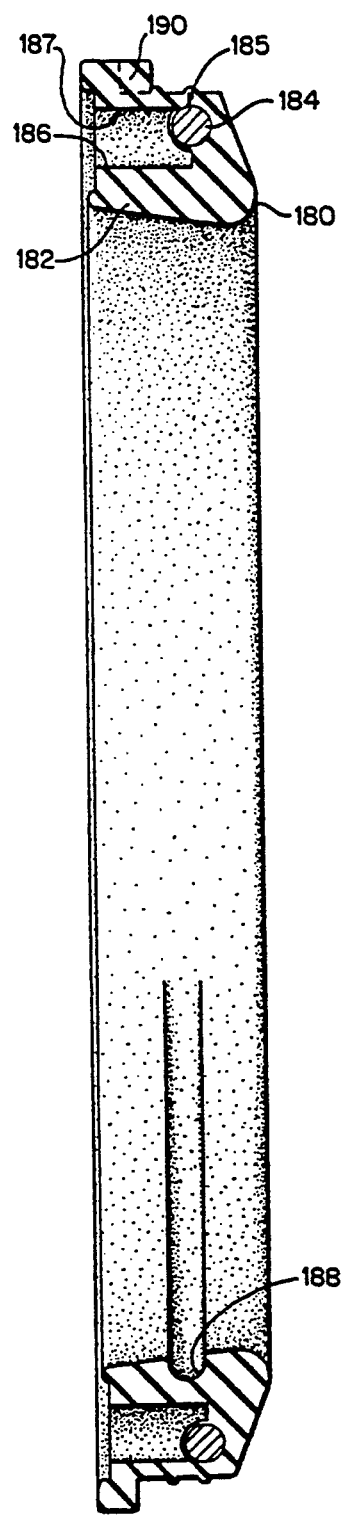
FIG. 20 is a cross section taken along line 20—20 of FIG. 19.

As shown in FIGS. 19 and 20, the axially inner sealing end 180 of the sleeve 182 is in a position which is located radially inwardly as compared with the location of the stiffener ring 184. The stiffener ring 184 is of a larger overall ring diameter as compared to the embodiment of FIG. 3. Thus the stiffener ring 184 is positioned radially outwardly relative to the sleeve sealing end 180 and so that the radially outermost surface 185 of the stiffener ring 184 is at a radial distance from the longitudinal axis of the valve equal to the radial distance of the radially outer surface 187 of the compression holes 186.

Figure 23:
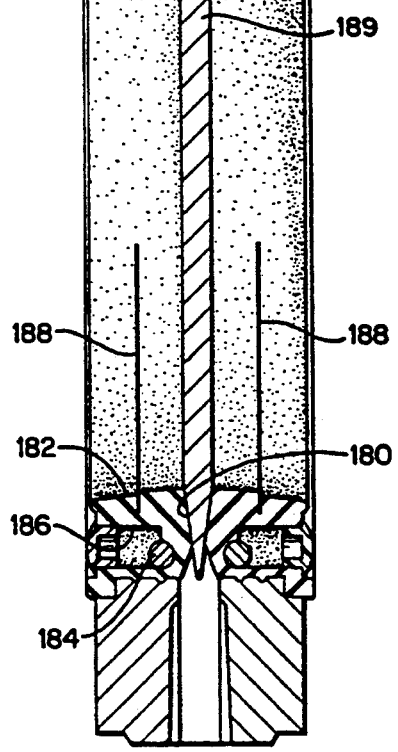
Figure 25:
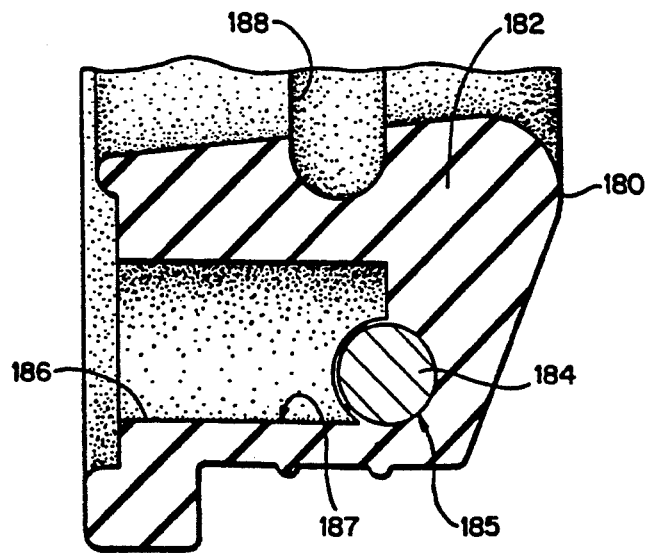
FIG. 25 is an enlarged cross section through one of the openings in the sleeve, showing the sleeve and stiffener ring of the gate valve of FIG. 19.
Figure 26:
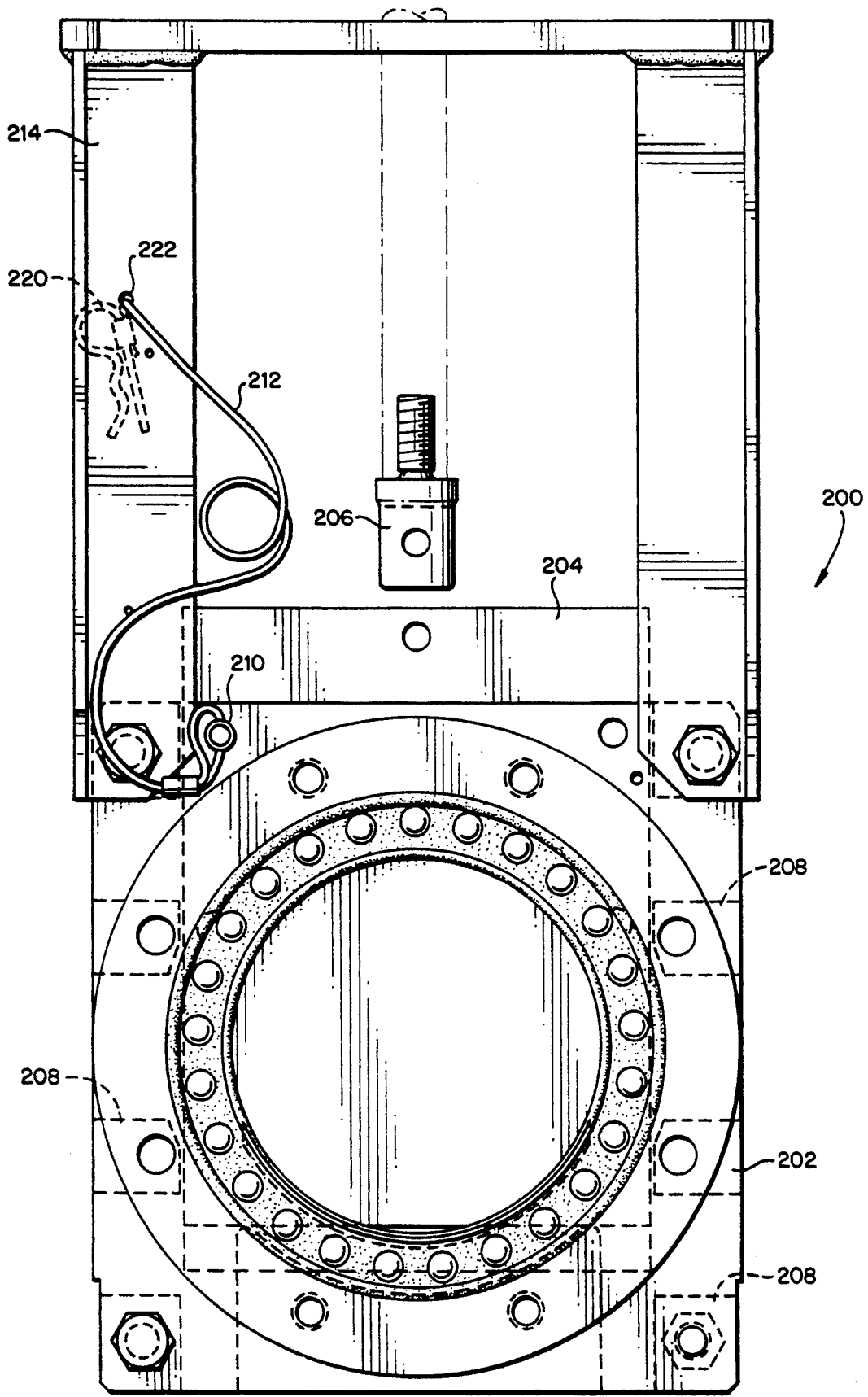
FIG. 26 is an end elevation of the line blind valve of the present invention, as viewed from one end of the valve, showing the valve in the closed position and with lockout installed.

Operational tests have shown that after the gate moves past the four and eight o'clock position in a closing cycle, a significant increase in actuating force is required. This is because of the wave of sleeve material being pushed ahead of the gate. The groove 188 assists in improving performance during the closing cycle. In FIGS. 19 through 23 and 25, there is shown the groove 188 which extends over an arc of approximately 120 degrees between the four o'clock and eight o'clock positions. The gate closing sequence in FIGS. 21 through 23 shows how the groove 188 closes up as the gate 189 moves downwardly to the fully closed position of the valve. As shown in FIG. 25, the center of the groove 188 is located at approximately the midpoint of the sleeve axial length. This location may vary slightly depending on valve size.

Figure 24:
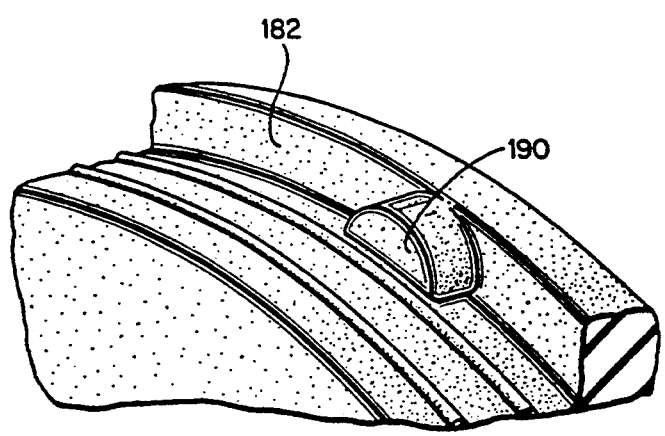
FIG. 24 is a perspective view of a portion of the gate valve sleeve of FIG. 19 showing the alignment key.

A sleeve alignment key 190 is provided on either side of the upper portion of each sleeve 182, as shown in FIGS. 19, 20 and 24, to insure that the sleeves will be positioned correctly within the valve so that the groove 188 is located in the four to eight o'clock position.

In the embodiment of the invention as shown in FIGS. 26 through 33, there is shown a line blind valve 200 which includes housing halves 202 for coaxial insertion into a pipeline. The gate or blind 204 is shown in the closed position in FIGS. 26 and 27 and in the open position in FIGS. 28 and 29. A clevis or yoke 206 connects the gate 204 with an actuator (not shown).

Openings in the form of rectangular shaped slots or windows 208 are machined on both sides of the housings 202 as well as the provision of an opening 209 at the bottom so that all four edges of the gate 204 will be visible when the gate 204 is in the closed position. This is to insure that no flow path will develop which would permit downstream leakage when the gate 204 is closed. Any leakage will flow to the outside.

Figure 30:
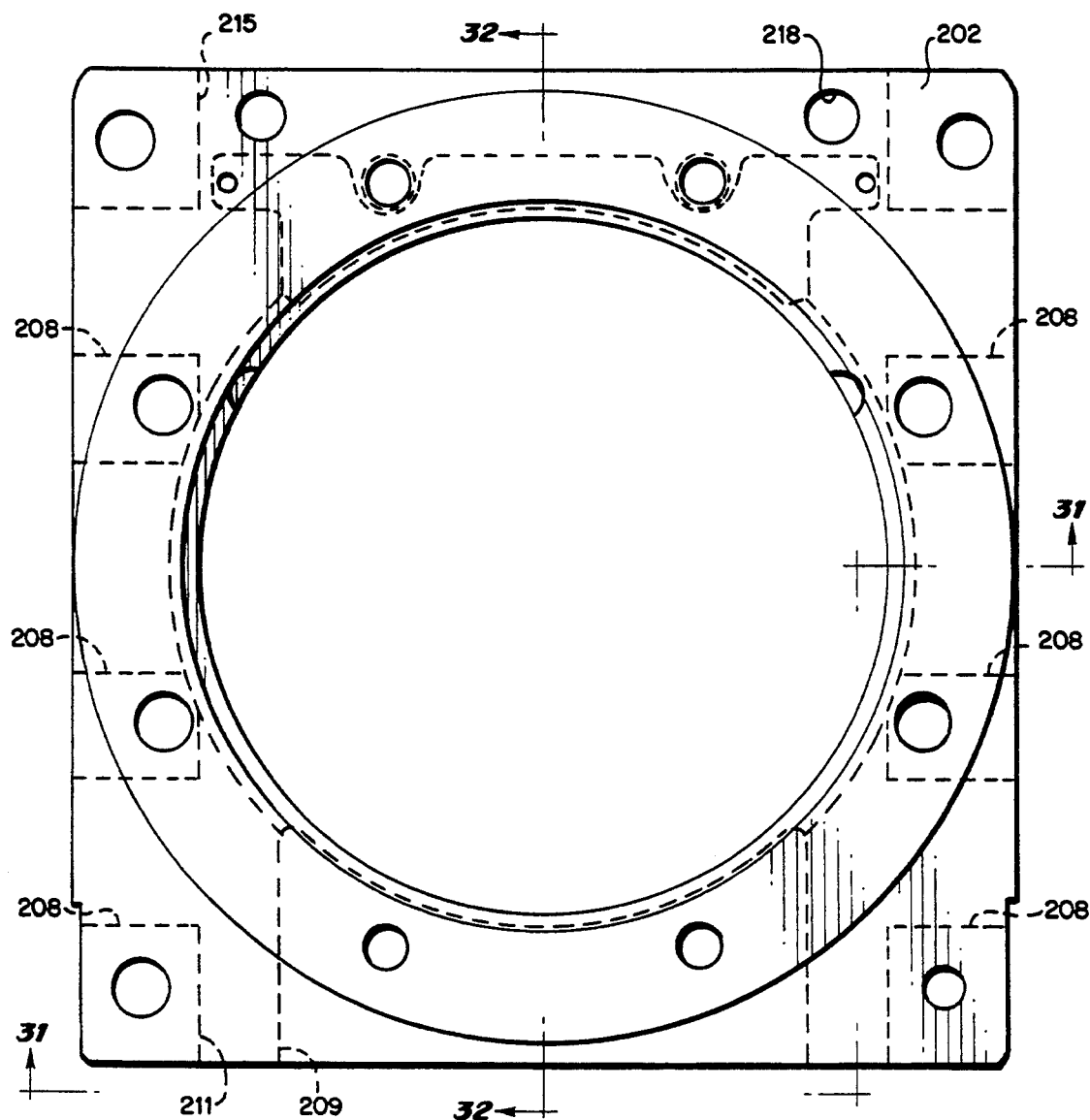
Figure 31:
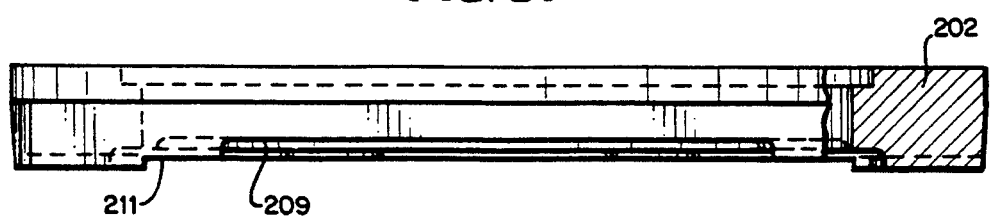
FIG. 31 is a cross section taken along line 31—31 of FIG. 30.

As shown in FIGS. 30 through 33, each of the housing halves 202 is provided with machined channels which form slots to allow viewing of the gate edges from the exterior of the housing. Thus slots 208 on the sides extend through to the side edges of the gate 204. These slots 208 on the sides have a width approximately equal to the width of the gate 204. At the lower portion of the housing, a slot 209 is provided so as to further enlarge the opening 211 through which the gate 204 extends, thus allowing visibility of the lower edge of the gate 204, as shown in FIG. 31. An opening or slot 215 is also provided in the upper portion of the housing 202 for passage of the gate 204, as shown in FIGS. 30 and 33.

Thus the line blind valve of the present invention satisfies the requirement for line blind service in those jurisdictions which require the visibility of all edges to indicate that the gate or blind 204 has passed completely through the seals.

The other requirement for the line blind is the lockout when the gate 204 is closed. This requirement is met by an assembly which includes the use of a lockout/clevis pin 210 attached to one end of a lanyard 212, as shown in FIGS. 26 through 29, and with the lanyard 212 being attached on the other end to a hairpin cotter 220. The lockout/clevis pin 210 passes through respective holes 216, 218 in the gate 204 and housings 202 which are aligned when the gate 204 is closed. This action locks the gate 204 in the closed position. The lockout/clevis pin 210 is also used for attaching the clevis 206 on the actuator stem to the gate 204 in the open position, but with the lockout/clevis pin 210 being removed from the yoke 206 and installed in the housings 202 and gate 204 in the closed position. Thus there is achieved a double effect, in that inadvertent movement of the actuator while the gate 204 is closed will not cause stress or damage to the line blind.

Figure 28:
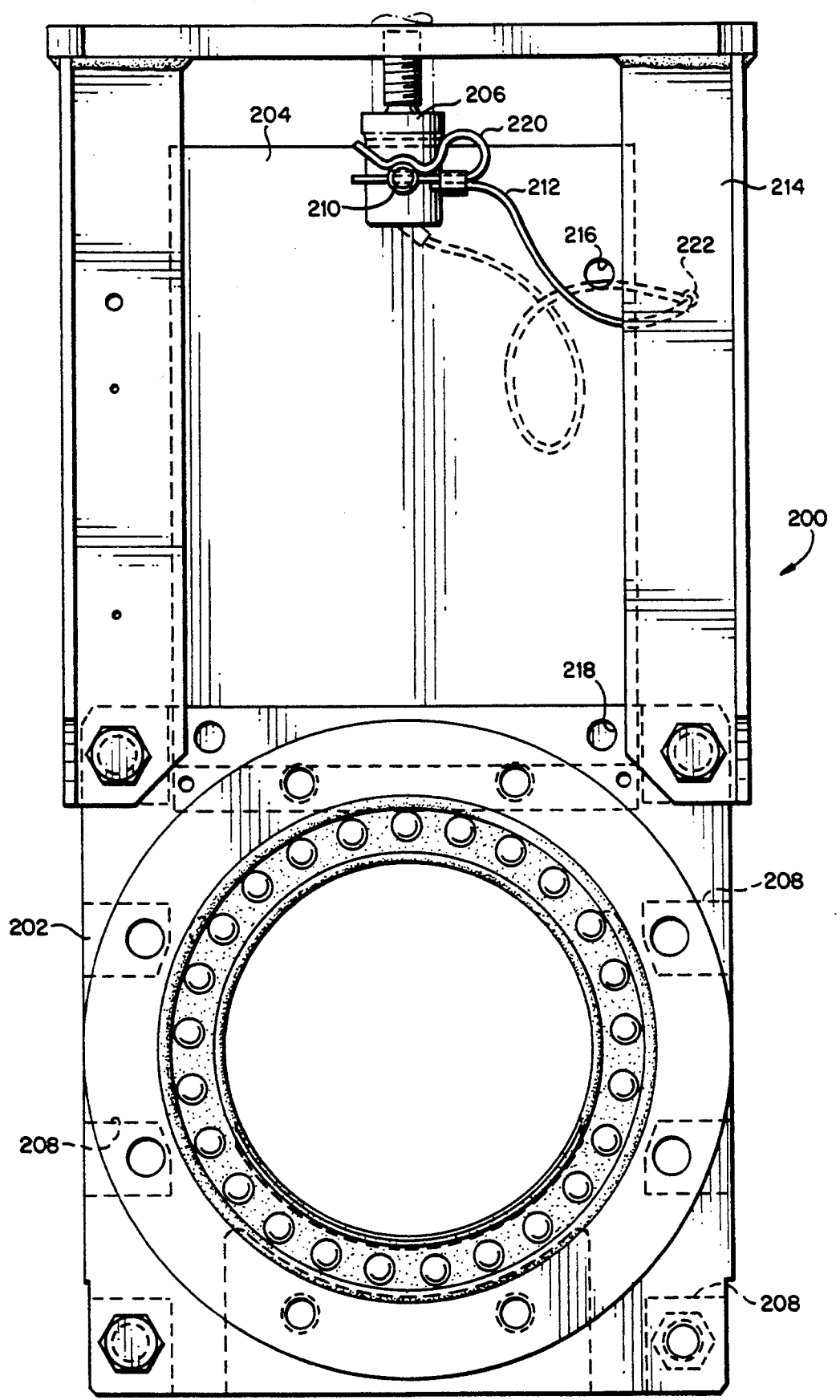
FIG. 28 is an end elevation of the line blind valve of the present invention, as viewed from the opposite direction from FIG. 26, with the valve in the open position, the lockout in the gate and yoke and with the hair pin cotter installed.

In the operation of the line blind valve 200, the gate 204 is up when the valve is in the open position, as shown in FIG. 28, with the lockout/clevis pin 210 installed through the yoke 206 and gate 204 and retained in position by the hairpin cotter 220. The hairpin cotter 220 is permanently attached to one end of the lanyard 212 which in one embodiment is in the form of a flexible stainless steel cable that passes through a hole 222 in one frame support leg 214, and the other end of the cable is permanently attached to the lockout/clevis pin 210. In an alternative embodiment, the cable 212 is secured at one end to the frame support leg 214 and at the other end to the lockout/clevis pin 210.

When the actuator is operated, the assembly which includes the gate 204, yoke 206 and pin 210 moves downwardly a distance determined by the stroke of the actuator. At the end of the stroke, the assembly stops, placing the line blind in the closed position. In this position, the through hole 216 in the gate 204 is in alignment with the set of through holes 218 in the housings 202. The hairpin cotter 220 is removed from the lockout/clevis pin 210 so that the lockout/clevis pin 210 may then be removed from the yoke 206 and gate 204 and installed through the holes 216, 218 that are aligned in both the housings 202 and the gate 204. A slot 224 in the lockout/clevis pin 210 can accept a lockout device and subsequently be secured with a lock. By reversing the above described sequence, the valve 200 may be returned to the open position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by Letters Patent is:

1. A line blind valve assembly comprising two body housing members having coaxial through passages and being secured together in end to end relation, each of said passages being defined by a housing plate, with means to define a relatively narrow transverse chamber, in which a gate or blind member having top and bottom edges and two side edges is slidable between a valve open position in which the gate does not block fluid flow through the passages, and a closed position in which the gate is interposed between the passages, each of said housing members having a plurality of openings or slots adjacent the gate member such that each of said top and bottom edges and two side edges of said gate member is visible from the exterior of said housing members, and with a unitary annular sealing sleeve unit lining each of said passages and extending the entire length of each passage whereby each sleeve unit has an inner end extending into the chamber and an outer end at a passage end remote from the chamber.

2. The line blind valve assembly of claim 1 wherein each of the sleeve units has an axially inner end portion extending into the chamber and adapted to sealingly engage each other or the gate under compression in the open position of the valve, and with the gate between the sleeve inner end portions when the valve is closed, each of the sleeve units being in the form of an axially deformable annular body of elastomeric material which is uniformly resilient throughout its volume, and with an encircling stiffening ring of harder material encapsulated within said sleeve.

3. The line blind valve assembly of claim 2 wherein each sleeve unit has a plurality of compression holes extending axially within the sleeve and positioned at intervals with respect to the circumference of the sleeve.

4. The line blind valve assembly of claim 3 wherein said compression holes and said stiffening ring are positioned so that the stiffening ring is located adjacent the axially inner end of said compression holes.

5. The line blind valve assembly of claim 1 wherein each of the two body housing members forms one of two opposed similar housing halves and wherein the openings which allow visibility of the gate edges are formed equally in each of the housing halves.

6. The line blind valve assembly of claim 1 wherein the openings which allow visibility of the side edges of the gate have a width approximately equal to the width of the gate.

7. The line blind valve assembly of claim 1 wherein a locking flange seal is provided at the axially outer end of each sleeve, extending radially outwardly for use in locking the sleeve in place.

8. The line blind valve assembly of claim 1 wherein a pair of locking beads are located approximately midway along the radially outer surface of each sleeve.

9. The line blind valve assembly of claim 1 wherein each sleeve unit is provided with at least one sealing bead extending circumferentially around the axially outer end of each sleeve unit.

10. The line blind valve assembly of claim 1 wherein said line blind valve includes a clevis or yoke member for removably securing the gate to a gate actuating means, and further including a lockout device having a pin member, means for removably mounting said pin member in said clevis and said gate member so as to secure said gate to the gate actuating means when said gate is in the open position and during movement of the gate to and from the closed position, and means for removably mounting said pin member in said gate member and at least one of said body housing members in the closed position of said gate, whereby the gate is free of attachment to said actuating means in the closed position.

11. A lockout device for use with a line blind valve having two body housing members with coaxial through passages and being secured together in end to end relation, each of said passages being defined by a housing plate, with a chamber disposed between said housing members in which a gate or blind member is slidable between a valve open position in which the gate does not block fluid flow through the passages, and a closed position in which the gate is interposed between the passages, wherein said line blind valve includes a clevis or yoke member for removably securing the gate to a gate actuating means, said lockout device comprising:

a pin member; means for removably mounting said pin member in said clevis and said gate member so as to secure said gate to the gate actuating means when said gate is in the open position and during movement of the gate to and from the closed position; and means for removably mounting said pin member in said gate member and at least one of said body housing members in the closed position of said gate, whereby the gate is free of attachment to said actuating means in the closed position.

12. The lockout device of claim 11 wherein said pin member is attached to one end of a lanyard which passes through an opening in at least one of said housing members.

13. The lockout device of claim 11 wherein said pin member includes a slot in the outer end thereof for receiving a cotter pin or a lock.

14. The lockout device of claim 12 wherein a hairpin cotter is attached to a second end of said lanyard.

15. The lockout device of claim 11 wherein said line blind valve includes a unitary annular sealing sleeve unit lining each of said passages and extending the entire length of each passage whereby each sleeve unit has an inner end extending into the chamber and an outer end at a passage end remote from the chamber, and with each of the sleeve units having an axially inner end portion extending into the chamber and adapted to sealingly engage each other or the gate under compression in the open position of the valve, and with the gate between the sleeve inner end portions when the valve is closed, each of the sleeve units being in the form of an axially deformable annular body of elastomeric material which is uniformly resilient throughout its volume, and with an encircling stiffening ring of harder material encapsulated within said sleeve.

16. The lockout device of claim 15 wherein said line blind valve further includes a plurality of compression holes extending axially within the sleeve and positioned at intervals with respect to the circumference of the sleeve.

* * * * *